(12) United States Patent
Ishikawa et al.

(10) Patent No.: US 7,759,837 B2
(45) Date of Patent: Jul. 20, 2010

(54) ROTATING ELECTRICAL MACHINE

(75) Inventors: Toshio Ishikawa, Hitachinaka (JP);
Minoru Yabuki, Ibaraki (JP); Yoshihisa Ishikawa, Hitachinaka (JP); Kazuo Tahara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/141,550

(22) Filed: Jun. 18, 2008

(65) Prior Publication Data
US 2008/0315700 A1    Dec. 25, 2008

(30) Foreign Application Priority Data
Jun. 19, 2007   (JP)  .............................. 2007-160847

(51) Int. Cl.
*H02K 1/14*      (2006.01)
(52) U.S. Cl. ...................... 310/257; 310/263
(58) Field of Classification Search ............... 310/49 R, 310/257, 263
See application file for complete search history.

(56) References Cited

U.S. PATENT DOCUMENTS

| | | | | |
|---|---|---|---|---|
| 5,121,017 A | * | 6/1992 | Yamamoto et al. | 310/49 R |
| 5,828,145 A | * | 10/1998 | Nakamura | 310/67 A |
| 6,486,576 B1 | * | 11/2002 | Yura et al. | 310/49 R |
| 2002/0117934 A1 | * | 8/2002 | Kanazawa et al. | 310/263 |
| 2008/0136272 A1 | * | 6/2008 | Ishikawa et al. | 310/58 |

FOREIGN PATENT DOCUMENTS

| | | | |
|---|---|---|---|
| JP | S62-152363 A | | 7/1987 |
| JP | 02159949 A | * | 6/1990 |
| JP | 06-31377 U | | 4/1994 |
| JP | 08-103040 A | | 4/1996 |
| JP | 2005-151785 A | | 6/2005 |
| WO | WO 2007/043161 A1 | | 4/2007 |

* cited by examiner

*Primary Examiner*—Tran N Nguyen
(74) *Attorney, Agent, or Firm*—Crowell & Moring LLP

(57) ABSTRACT

Stator claw poles are disposed at a stator core at a position facing opposite a rotor so as to alternately range from the two sides along the axial direction. With a plurality of magnetic poles thus formed, the distance by which the gap between the front end portions of the stator claw poles and the stator outer circumference ranges is increased, which, in turn, reduces the reactance guided to a stator coil. It is ensured that the magnetic reluctance manifesting between the front end portions of the stator claw poles and an enclosing member that holds the stator core, facing opposite the centers of the claw poles along the circumferential direction, is greater than the magnetic reluctance manifesting between the front portions and the stator core enclosing member facing opposite the front end portions.

16 Claims, 15 Drawing Sheets

FIG.7A      FIG.7B
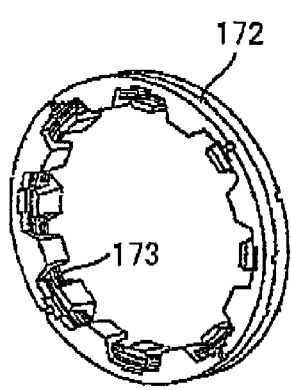
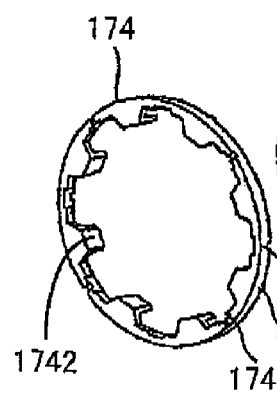
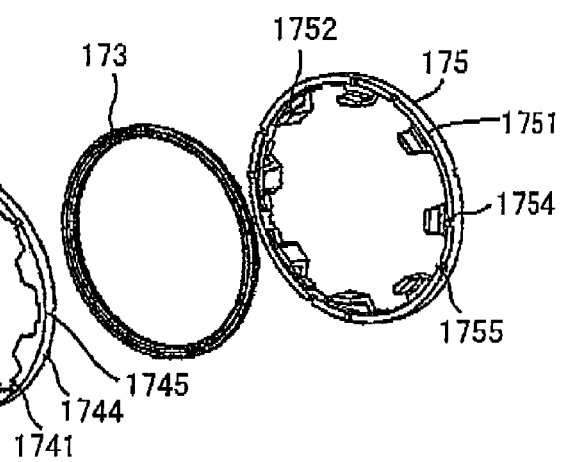

ROTATING ELECTRICAL MACHINE

CROSS-REFERENCE TO RELATED APPLICATION

The present application relates to subject matters described in a co-pending patent application Ser. No. 11/950,595 filed on Dec. 5, 2007 entitled "ROTATING ELECTRICAL MACHINE".

INCORPORATION BY REFERENCE

The disclosure of the following priority application is herein incorporated by reference:

Japanese Patent Application No. 2007-160847 filed Jun. 19, 2007

BACKGROUND OF THE INVENTION

1. Field of the Invention

The present invention relates to a rotating electrical machine such as an electric generator or a motor.

2. Description of Related Art

A stator in an electric generator, a motor or the like includes a stator core having formed therein a plurality of slots opening toward the rotational axis center and disposed side-by-side along the circumferential direction and a plurality of stator coils wound through the individual slots.

The rotating electrical machine assuming such a structure cannot be manufactured with a higher level of efficiency since the stator coils need to be wound through narrow slots.

Japanese Laid Open Patent Publication No. 2005-151785 (Patent reference literature 1) discloses a technology whereby armature coils corresponding to a U-phase, a V-phase and a W-phase are installed in a coil pattern at the phase stators arranged along the rotational axis and magnetic pole teeth are disposed further inside with an offset by a predetermined angle along the circumference of the rotational axis but in line with one another along the axial direction in a three-phase synchronous generator. The technology disclosed in the literature simplifies the coil winding operation and thus improves the productivity. However, the literature does not include any mention of how the characteristics may be improved. The electric generator disclosed in patent reference literature 1 includes a rotor constituted with separate permanent magnets each used in correspondence to one of the phases, and for this reason, it cannot be used as an alternator for vehicle engaged in operation in an environment in which the rotation speed is bound to change over a wide range.

While it is essential that a rotating electrical machine assure both better efficiency in the manufacturing process and improved characteristics, the literature mentioned above does not discuss an aspect of the potential improvement in the characteristics.

The present invention is to provide a rotating electrical machine assuring outstanding output performance.

SUMMARY OF THE INVENTION

A rotating electrical machine according to a first aspect of the present invention includes: a field coil wound around a rotational axis; a rotor core that comprises rotor claw poles that are magnetized with alternating polarities with a magnetic flux induced via the field coil disposed along a circumference of the rotational axis; a stator coil wound around in an annular pattern on an outer circumferential side of a rotor; and a stator core that comprises stator claw poles located at a position facing opposite the rotor and alternately extending from two sides taken along an axial direction, wherein: the stator core comprises a recess ranging from a point near a front end portion of each of the stator claw poles to a rear surface of the stator core.

A rotating electrical machine according to a second aspect of the present invention includes: a field magnet disposed around a rotational axis; a rotor core disposed so as to hold the field magnet and comprises field magnetic poles located at positions facing opposite claw poles at a stator core; a stator coil wound around in an annular pattern on an outer circumferential side of a rotor; and a stator core that comprises stator claw poles located at a position facing opposite the rotor and alternately extending from two sides taken along an axial direction and is disposed so as to surround the stator coil, wherein: a reactance to be guided to the stator coil is reduced by keeping down a quantity of an interlinking magnetic flux traveling from front ends of the stator claw poles through an enclosing member encasing the stator core generated with an electric current flowing through the stator coil.

According to a third aspect of the present invention, in the rotating electrical machine according to the first and second aspects, it is preferable that a magnetic reluctance manifesting between front ends of the stator claw poles and a recessed portion facing opposite centers of the stator claw poles along the circumferential direction is set greater than the magnetic reluctance between the front ends of the claw poles and the recessed portion facing opposite the front ends.

According to a fourth aspect of the present invention, in the rotating electrical machine according to the first and second aspects, the front ends of the stator claw poles may be positioned beyond the recessed portion facing opposite the stator claw poles along the axial direction.

According to a fifth aspect of the present invention, in the rotating electrical machine according to the fourth aspect, the recessed portion facing opposite the stator claw poles may be formed in one of a quadrangular shape, a triangular shape, a trapezoidal shape and a circular arc shape along the axial direction.

According to a sixth aspect of the present invention, in the rotating electrical machine according to the first and second aspects, it is preferable that the stator claw poles to interlink with a magnetic flux from the rotor are formed so as to have a smaller sectional area at the front ends thereof than a sectional area of base portions of the stator core claw poles, within a sectional area range in which no magnetic saturation is induced by the interlinking magnetic flux.

According to a seventh aspect of the present invention, in the rotating electrical machine according to the first and second aspects, it is preferable that the stator claw poles are formed so that a thickness thereof measured along the circumferential direction, which is smallest starting at the front ends, gradually increases along the axial direction.

According to a eighth aspect of the present invention, in the rotating electrical machine according to the seventh aspect, the stator claw poles may be formed so that the thickness changes continuously along the axial direction from the front ends.

According to a ninth aspect of the present invention, in the rotating electrical machine according to the seventh aspect, the stator claw poles may be formed so that the thickness changes in stages along the axial direction from the front ends.

According to a 10th aspect of the present invention, in the rotating electrical machine according to the seventh aspect, it is preferable that the thickness changes on a side on which surfaces facing opposite the stator coil are present along the axial direction from the front ends.

According to a 11th aspect of the present invention, in the rotating electrical machine according to the first and second aspects, it is preferable that base portions of claw poles at the rotor assume a greater width relative to middle portions, the middle portions assume a greater width than front end portions and the middle portions sustain a substantially constant width.

The present invention provides a rotating electrical machine with superior output performance.

BRIEF DESCRIPTION OF THE DRAWINGS

FIGS. 7A and 7B provide a perspective of a phase stator corresponding to a given phase and a view of individual parts constituting the phase stator in a perspective;

DESCRIPTION OF PREFERRED EMBODIMENTS

In the embodiments to be described in detail below, all adopting a structure that includes a rotor constituted with an electromagnet and a common field coil used in conjunction with different phases instead of separate field coils corresponding to the individual phases, a greater number of turns can be assumed at the field coil and better output characteristics are achieved at low rotation speed.

In addition, the embodiments described below achieve a significant improvement in output characteristics by reducing the reactance. Since the operation at higher rotation speed is affected by the reactance to a greater extent, the characteristics at higher rotation speeds, in particular, are improved through the embodiments. The rotation speed of the rotor in an alternator for vehicle changes over a wide range and, accordingly, an improvement in the characteristics may be achieved by adopting the present invention even as the rotor rotation speed changes over a wide range.

First Embodiment

Figure 1:
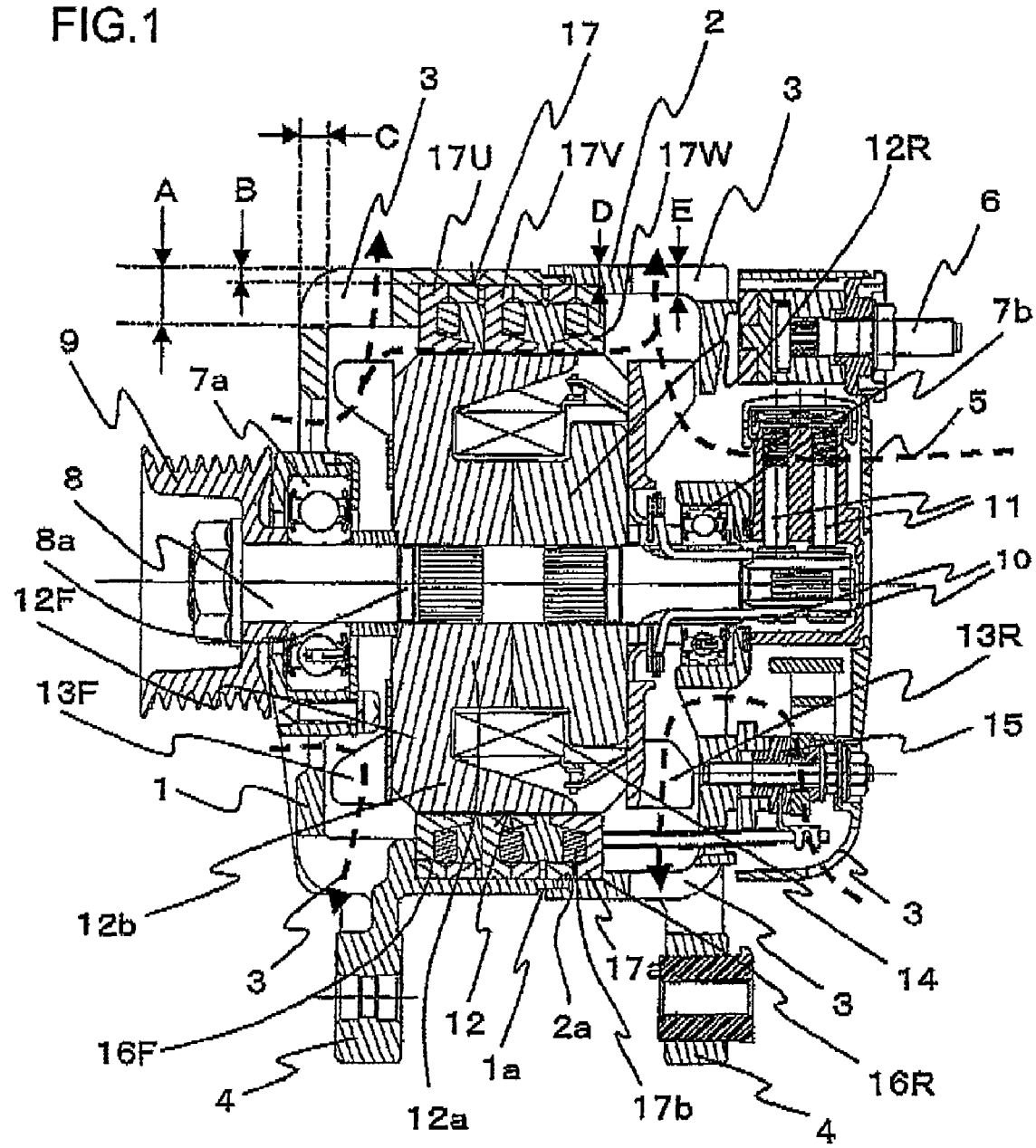
FIG. 1 is a sectional view taken through a side of an alternator for vehicle achieved in an embodiment of the rotating electrical machine according to the present invention.
Figure 2:
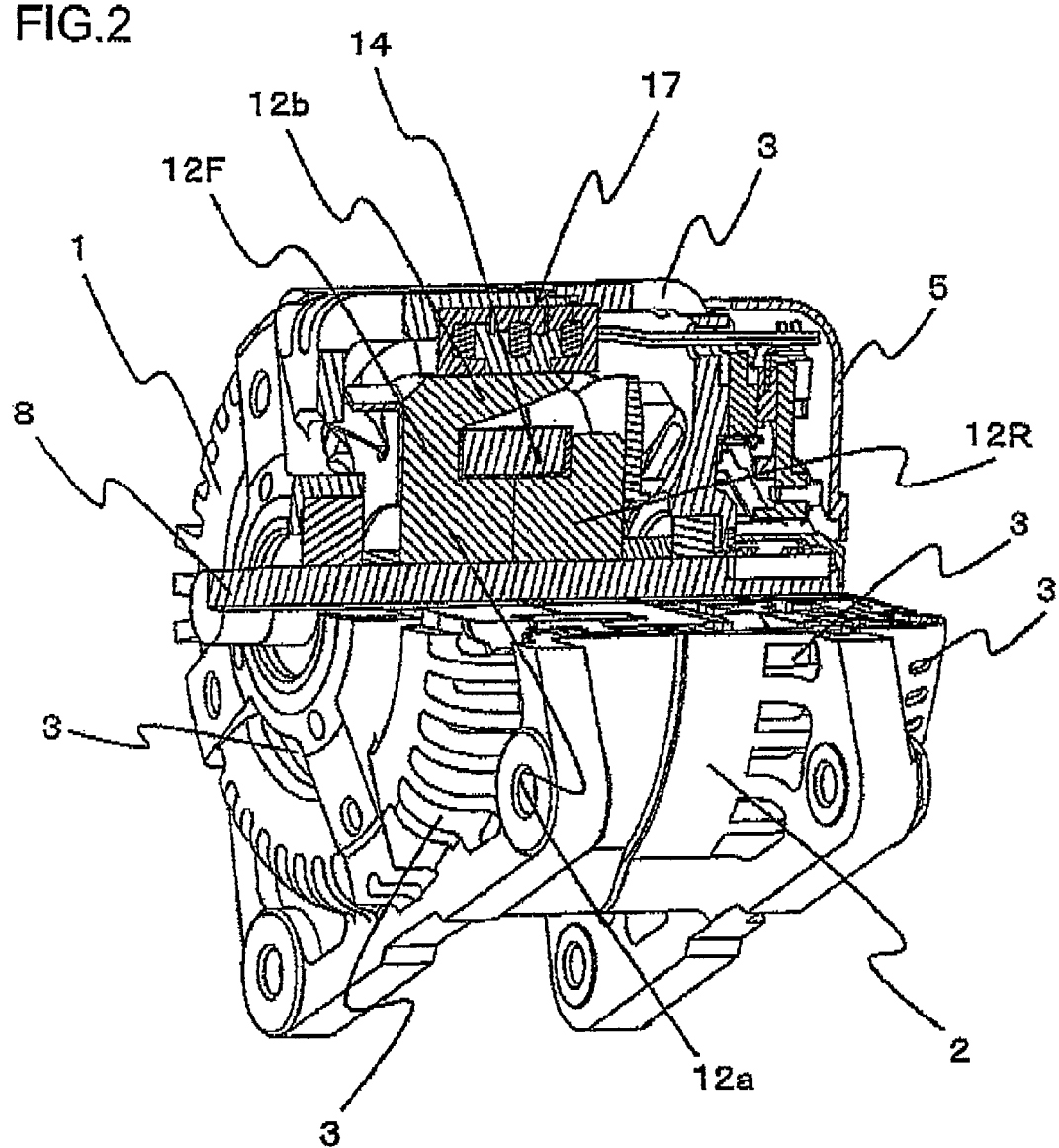
FIG. 2 is a perspective showing part of the alternator for vehicle in the embodiment of the rotating electrical machine according to the present invention in a sectional view.
Figure 3:
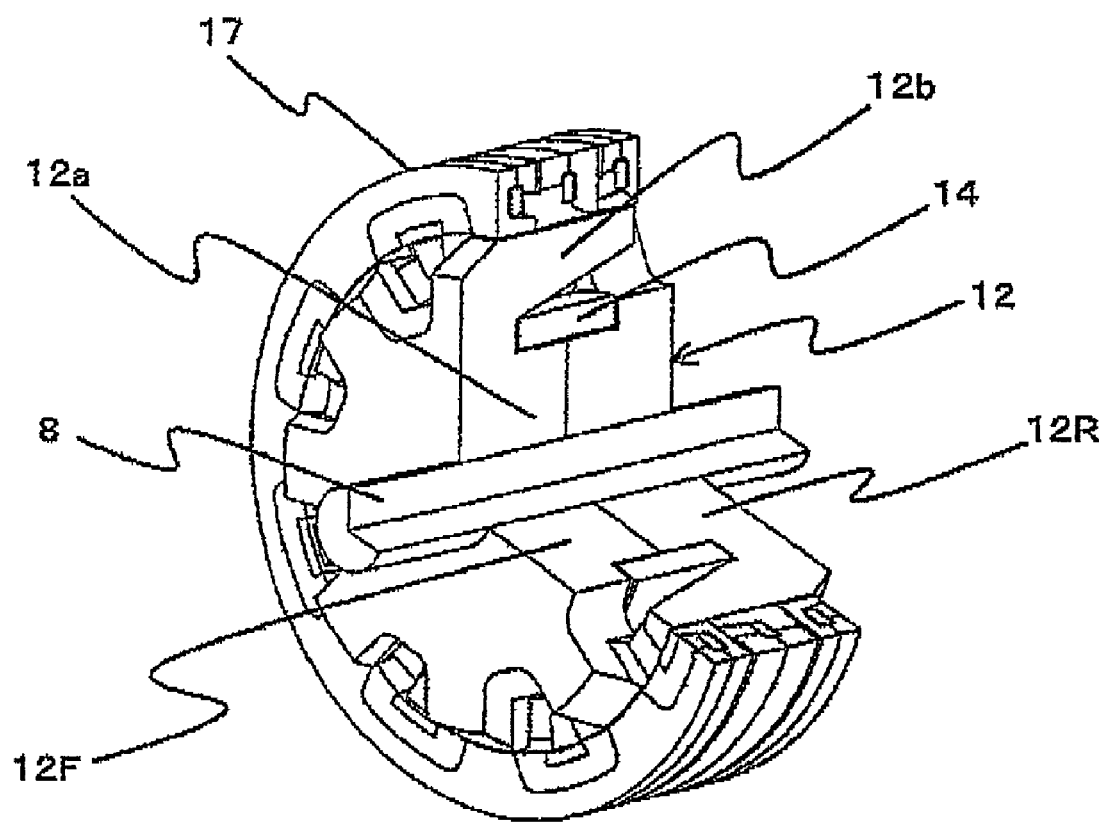
FIG. 3 is a perspective showing a rotor and a stator in a partial sectional view.
Figure 4:
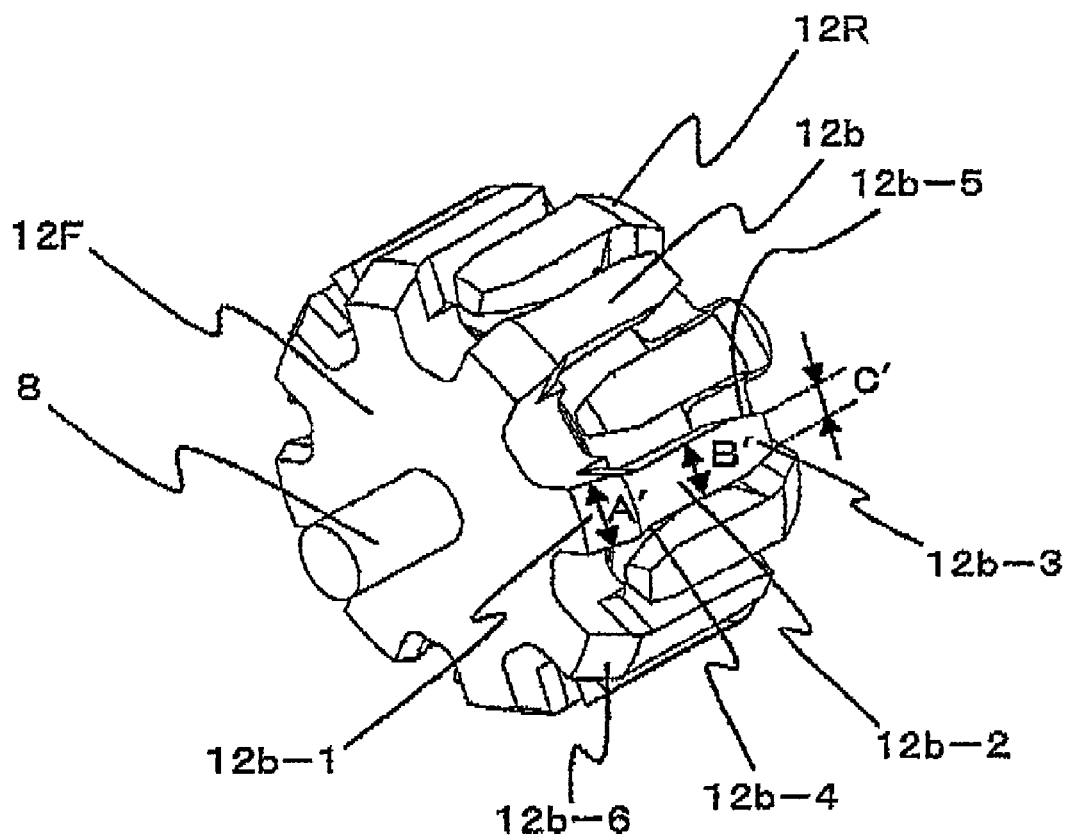
FIG. 4 is a perspective of the rotor.
Figure 5:
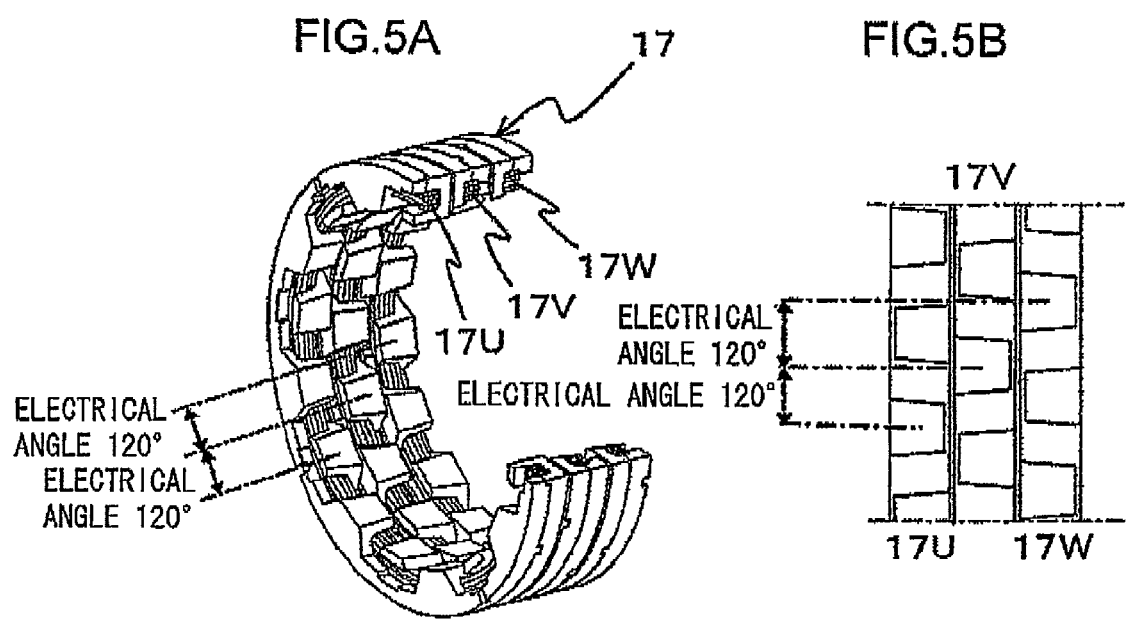
FIGS. 5A and 5B provide a perspective of the stator in a partial sectional view and a view of the stator taken from the inner circumferential side.
Figure 6:
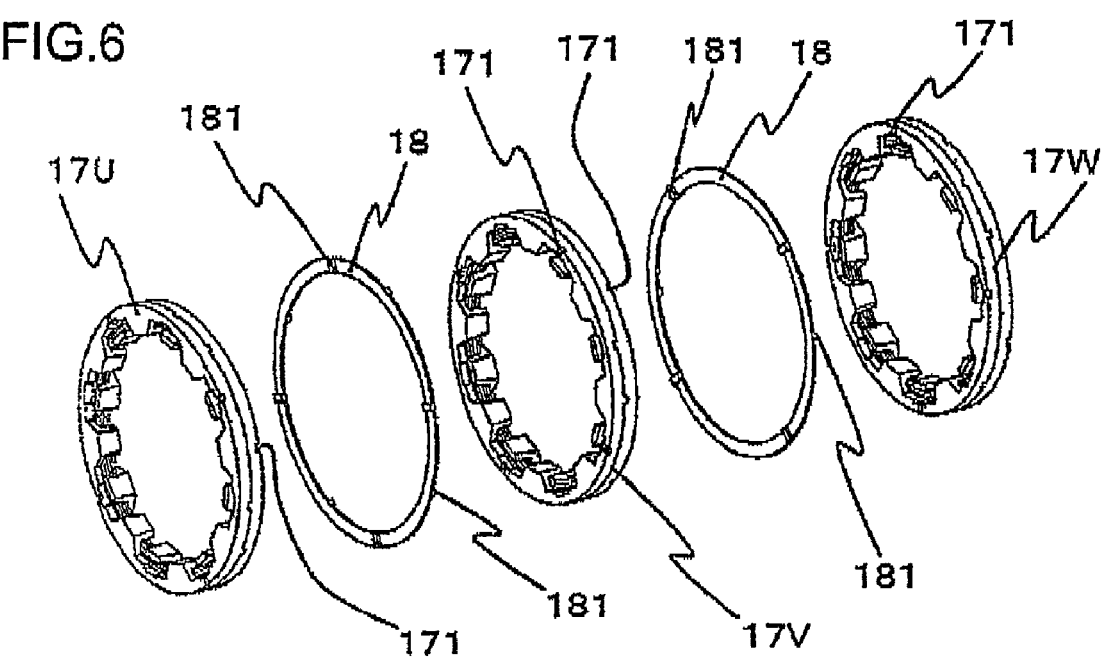
FIG. 6 is a perspective of phase stators.

In reference to FIGS. 1 through 7, the alternator for vehicle achieved in an embodiment of the rotating electrical machine according to the present invention is described. FIG. 1 is a sectional view taken through a side of the alternator for vehicle. FIG. 2 is a perspective showing the alternator for vehicle in a partial sectional view. FIG. 3 is a perspective of a rotor and a stator in a partial sectional view. FIG. 4 is a perspective of the rotor. FIG. 5A is a perspective showing the stator alone in a partial sectional view. FIG. 5B shows the stator viewed from the inner circumferential side. FIG. 6 is a perspective showing the phase stators. FIG. 7A is a perspective of a phase stator corresponding to a single phase and FIG. 7B is a perspective showing various parts in FIG. 7A.

The alternator for vehicle achieved in the embodiment in FIG. 1 includes a front bracket 1 disposed on the left side in the figure and a rear bracket 2 disposed on the right side in the figure. They each assume the shape of a bottomed tube with an internal space available for housing components of the alternator, i.e., they each assume the shape of a bowl. A plurality of air holes 3, through which air flows, are formed so as to open both on the inner circumferential side and the outer circumferential side at the front bracket 1 and the rear bracket 2 as shown in FIG. 2.

With A representing the wall thickness of the front bracket 1 measured over the area closer to the rear bracket 2 on the outer circumferential side along the radial direction and B representing the wall thickness of the front bracket 1 over the area toward the bottom surface, a relationship expressed as A>B is true. In addition, a fitting portion 1a constituted with a circular stage at which the rear bracket 2 can be fitted, is formed at the outer circumference of the front bracket 1 at the end thereof toward the rear bracket 2. With C representing the wall thickness of the front bracket 1 measured at an end surface side along the axial direction, a relationship expressed as A>C>B is true.

A relationship similar to the relationship of the wall thickness at the front bracket 1 is achieved at the rear bracket 2 with regard to its wall thickness over the area on the outer circumferential side along the radial direction, i.e., D<E, with D representing the wall thickness over the area closer to the front bracket 1 and E representing the wall thickness measured over the area toward the bottom. A fitting portion 2a constituted with a ring-shaped stage, at which the fitting portion 1a of the front bracket 1 can be fitted is formed at the inner circumference at the end of the rear bracket 2 with the wall thickness D. It is to be noted that the wall thickness E at the rear bracket 2 is greater than the wall thickness B at the front bracket 1.

The front bracket 1 and the rear bracket 2 each include a locking portion 4 with a locking hole opening therein, formed as an integrated part thereof, and project out toward the outer circumference along the radial direction. The front bracket 1 and the rear bracket 2 are mounted on the vehicle at the locking portions 4 via bolts (not shown). The front bracket 1 and the rear bracket 2 are formed through die-casting by using an aluminum alloy.

A rear cover 5 with a wall thickness smaller than those of the brackets is attached to the rear bracket 2 at an end thereof along the axial direction. The rear cover 5 assumes a shape similar to those of the brackets, i.e., the shape of a bottomed tube, i.e., a bowl so as to house components in the space formed therein. A plurality of air holes 3, through which air is to flow, are formed to open on the inner circumferential side and the outer circumferential side of the rear cover 5 as well. In addition, a terminal 6 to be connected to a battery is mounted at the outer circumferential side of the rear cover 5. The rear cover 5 may be constituted of a resin or an aluminum alloy.

Ball bearings 7a and 7b are respectively disposed at substantial central positions along the radial direction at outer ends of the front bracket 1 and the rear bracket 2 along the axial direction. The outer diameter of the ball bearing 7a installed at the front bracket 1 is greater than that of the ball bearing 7b installed at the rear bracket 2.

A shaft 8 is disposed so as to extend through inner rings of the ball bearings 7a and 7b. The shaft 8 is rotatably supported so as to rotate relative to the front bracket 1 and the rear bracket 2.

A pulley 9 constituting a rotation transmission member is rotatably fixed via a bolt at a side end of the front bracket 1. As the engine (not shown) rotates, the rotation is transmitted via a belt to the pulley 9, thereby causing the shaft 8 to rotate.

At the end of the shaft 8 toward the rear bracket 2, two slip rings 10, which rotate as one with the shaft 8, are mounted and power is supplied via two brushes 11, which slide as they are each pressed against one of the slip rings 10.

A front-side rotor member 12F and a rear-side rotor member 12R, formed by using a magnetic material, are fixed at a substantial center of the shaft 8 along the rotational axis and these members rotate as one with the shaft 8. The outer side ends of the rotor members 12F and 12R move inside an annular groove 8a formed at the shaft 8 in a plastic flow so that their displacements along the axial direction are regulated with the front-side rotor member 12F and the rear-side rotor member 12R placed in contact with each other and facing opposite each other along the axial direction. The front-side rotor member 12F and the rear-side rotor member 12R fixed to the shaft 8 are part of a rotor 12.

At the two end surfaces of the rotor 12 along the rotational axis, plate-type fans 13F and 13R constituting an air supply means and equipped with a plurality of blades disposed on the outer circumferential side thereof are mounted, so as to rotate as one with the rotor 12. Air is distributed from the inner circumferential side toward the outer circumferential side with the centrifugal force induced as the fans 13F and 13R rotate.

The front-side rotor member 12F and the rear-side rotor member 12R are each constituted with a shaft portion 12a located on the inner circumferential side and a plurality of rotor claw poles 12b located on the outer circumferential side and assuming an L-shaped section along the radial direction. As the ends of the shaft portion 12a along the axial direction at the two rotor members 12F and 12R are placed in contact with each other while facing opposite each other, a rundle-type core is formed. A field coil 14 is installed to wind around the rotational axis between the outer circumferences of the axial portions 12a and the inner circumferences of the rotor claw poles 12b, and the two ends of the field coil 14 extend along the shaft 8 each to connect with one of the slip rings 10. Thus, a direct current supplied from the brushes 11 via the slip rings 10 flows through the field coil 14 thereby magnetizing the rotor 12. Since the rotor 12 rotates at a rate corresponding to the engine rotation speed, the level of voltage generated changes in correspondence to the engine rotation speed and the field current supplied to the field coil 14. A control circuit controls the field current supplied to the field coil so as to generate a voltage at a level corresponding to the state of the battery regardless of the engine rotation speed. This control circuit is installed at the rear of the rotating electrical machine. The control circuit, which may be a standard IC regulator (not shown) may be installed inside the rear cover 5. It includes a rectifier 15. AC power having been generated undergoes full wave rectification at the rectifier 15 and is thus converted to DC power which is then output through the terminal 6.

At stages 16F and 16R respectively formed at the area of the front bracket 1 between the portion with the wall thickness A and the portion with the wall thickness B and at the rear bracket 2 between the portion with the wall thickness D and the portion with the wall thickness E, phase stators constituting a three-phase stator 17 are disposed and firmly held in the order of a U-phase stator, a V-phase stator and a W-phase stator from the side toward the front bracket 1. It is to be noted that the U-phase stator 17U and the V-phase stator 17V are both housed in their entirety inside the front bracket 1, and that the W-phase stator 17W is partially housed inside the front bracket 1 with the remaining part housed inside the rear bracket 2. Thus, the stator 17 as a whole is in contact with the front bracket 1 over a greater contact area than with the rear bracket 2. Link plates 18 constituted of a non-magnetic material are inserted between the individual phase stators constituting the stator 17 and the phase stators are insulated from one another via the link plates 18. The inner circumference of the stator 17 structured as described above faces opposite the outline of the stator claw poles 12b at the rotor 12 over a small gap.

The phase stators constituting the stator 17 are each constituted with a stator core 172 formed by using a magnetic material and a stator coil 173 located inside the stator core so as to wind around in a coil pattern along the stator core 172 in the circumferential direction. The stator coils 173 corresponding to the individual phases are connected to the rectifier 15 installed in the rear cover 5. In addition, the rectifier 15 is connected to the battery via the terminal 6.

It is to be noted that the rectifier 15 is constituted with a plurality of diodes. More specifically, six diodes are used to constitute three-phase coils independent of one another to enable full wave rectification.

Next, in reference to FIG. 3 and FIG. 4, the rotor 12 functioning as the rotating element in the generator achieved in the embodiment is described in detail. As shown in FIG. 3, a plurality of (8) rotor claw poles 12b assuming an L-shaped section along the radial direction, which range from the outer side end of the axial portion 12a, are formed side-by-side along the circumferential direction at each of the rotor members, i.e., the front-side rotor member 12F and the rear-side rotor member 12R constituting the rotor 12. The rotor claw poles 12b at the front-side rotor member 12F and the rear-side rotor member 12R extend alternately to each other along the circumferential direction and there are a total of 16 rotor claw poles 12b at the rotor. In other words, the rotor 12 in the embodiment has 16 magnetic poles.

As shown in FIG. 4, the rotor claw poles 12b are each formed so that the width A' measured along the circumferential direction at a base portion 12b-1 located at the axial portion 12a is greater than its width B' measured along the circumferential direction at a middle portion 12b-2 facing opposite the field coil 14 and that the width B' measured along the circumferential direction at the middle portion 12b-2 facing opposite the field coil 14 is greater than its width C' measured along the circumferential direction at a front end portion 12b-3, as shown in FIG. 4. Namely, they are formed so as to achieve a relationship expressed as; A'>B'>C'.

In addition, at the base portion 12b-1, a first tapered portion 12b-4, which assumes a gradually decreasing width toward the field coil 14 at a specific position, i.e., a substantial halfway position taken along the axial direction over the range corresponding to the axial portion 12a is formed to range from a specific position, i.e., a substantial halfway position over the range of the rotor claw pole 12b along the radial direction. In addition, at the end of the base portion 12b-1 along the axis of the rotor 12, a sloping portion 12b-6, made to slope so that its diameter becomes smaller toward the inner circumferential side starting from the outer circumferential side, is formed. It is to be noted that the middle portion 12b-2 ranges along the axial direction from the area of the first tapered portion 12b-4 where the first tapered portion assumes a small width and that the inner circumferential side of the rotor claw pole 12b slopes so that its width taken along the radial direction becomes smaller toward the front end, as shown in FIG. 3.

In addition, a second tapered portion 12b-5 with its width becoming smaller toward the front end is formed at the front end portion 12b-3, and the middle portion 12b-2 sustaining a substantially uniform width extends between the first tapered portion 12b-4 and the second tapered portion 12b-5 along the axial direction. The middle portion 12b-2 is present over a range substantially facing opposite the field coil 14 and the taper angle at the first tapered portion 12b-4 and the taper angle at the second tapered portion 12b-5 are substantially equal to each other. This means that the gaps formed between the individual rotor claw poles 12b assume widths that are substantially uniform. Although not shown, a wide beveled area may be formed at a side edge of the rotor claw pole 12b located along a direction opposite from the rotating direction.

The front-side rotor member 12F and the rear-side rotor member 12R formed as described above, with the field coil 14 disposed between them, are fixed to the shaft 8 with the ends of their axial portions 12a in contact with each other so that their rotor claw poles 12b are positioned alternately to each other along the circumferential direction.

In addition, the front fan 13F and the rear fan 13R are mounted through welding or the like respectively at the outer ends of the front-side rotor member 12F and the rear-side rotor member 12R along the axial direction. The front fan 13F and the rear fan 13R are disposed in a symmetrical fan arrangement so that air is supplied toward the center as the rotor 12 rotates. For instance, the front fan 13F is formed by curving one side of each of a plurality of projections formed along the circumferential direction at a metal plate in a substantially circular arc shape through pressing, bending the circular arc side at a substantially right angle and thus forming a blade with sloping surfaces inclined along the radial direction as an integrated part thereof. The rear fan 13R adopts a structure similar to that of the front fan 13F. The front fan 13F and the rear fan 13R formed as described above are fixed to become part of the rotor assembly by, for instance, welding them to the outer ends of the front-side rotor member 12F and the rear-side rotor member 12R along the axial direction. The front fan 13F, the rear fan 13R and the rotor 12 provided as the rotating element together constitute an air supply means.

Next, in reference to FIGS. 3, 5, 6 and 7, the stator 17 is described in detail. As explained earlier, the stator 17 is a three-phase stator constituted with a U-phase stator, a V-phase stator and a W-phase stator. As shown in FIG. 6, the phase stators are integrated along the axial direction via the link plates 18 constituted of a non-magnetic resin and assuming an circular, or more specifically, a disk shape. It is to be noted that the link plates 18 each include four projecting portions 181 set over equal intervals along the circumferential direction at the two side surfaces thereof. The projecting portions 181 at one side surface and the projecting portions 181 at the other side surface are offset by 45° so that each assumes a middle position relative to those on either side. In addition, recessed portions 171 at which the projecting portions 181 can be fitted are formed at the two side surfaces of each stator core 172, and as they are assembled by inserting the projecting portions 181 at the recessed portions 171, the individual phase stators are positioned with an offset of an electrical angle of 120° in correspondence to the pitch assumed at the rotor 12, as shown in FIGS. 5A and 5B.

Next, in reference to FIG. 7, then U-phase stator 17U is described as a representative example of the various phase stators. The V-phase stator 17V and the W-phase stator 17W adopt structures identical to that of the U-phase stator 17U and they all achieve operational effects similar to one another. The phase stator 17U is constituted with a stator core 172 and a stator coil 173 and, as shown in FIG. 7B, the stator core 172 is split into two parts along the axial direction. Individual split stator core component members 174 and 175 respectively include an outer circumferential portion 1741 and 1751 located on the outer circumferential side assuming a circular shape and also assuming an L-shaped section along the radial direction and a plurality of (8) stator claw poles 1742 and a plurality of (8) stator claw poles 1752 located further inward relative to the outer circumferential portions and assuming an L-shaped section along the radial direction. Thus, the stator core component members 174 and 175 as a whole assume a U-shaped section along the radial direction. In addition, the side surfaces of the stator claw poles 1742 and 1752 along the circumferential direction slope relative to the line of the rotational axis. In other words, the stator claw poles are formed with a skew and assume a substantially trapezoidal shape with a tapered tip.

In addition, four projecting portion/recessed portion pairs, each made up with a projecting portion 1744 paired up with an adjacent recessed portion 1745, are formed at a surface of the stator core component member 174, whereas four projecting portion/recessed portion pairs, each made up with a projecting portion 1754 paired up with an adjacent recessed portion 1755, are formed at the surface of the stator core component member 175 facing opposite the surface of the stator core component member 174 where the projecting portions 1744 and the recessed portions 1745 are present. The projecting portions 1744 and 1754 are formed at substantially halfway positions between the stator claw poles 1742 and between the stator claw poles 1752 along the circumferential direction, respectively. Since the recessed portions 1745 and 1755 are present at substantially halfway points between adjacent stator claw poles 1742 and 1752 along the circumferential direction, the stator core component members 174 and 175 can be positioned by fitting the projecting portions with the recessed portions so as to set the stator claw poles 1742 and 1752 alternately to each other along the circumferential direction, thereby forming the stator core 172 having a total of 16 stator claw poles offset from each other by an electrical angle of 180°. In other words, each phase stator constituting the stator 17 in the embodiment includes 16 magnetic poles, matching the number of magnetic poles at the rotor 12.

It is to be noted that the stator cores 172 corresponding to the individual phases, as well as the stator core component members 174 and 175, are fixed together to form an integrated unit via a resin charged in the gaps formed between the stator claw poles 1742 and 1752. The resin is charged so as to lie substantially flush with the inner surfaces of the stator claw poles 1742 and 1752.

Since the stator cores 172 in the various phases need to be integrated via the resin filling the gaps between the stator core magnetic poles 1742 and 1752, the link plates 18 are set in contact with the stator cores over the side surfaces of the outer circumferential portions 1741 and 1751 but are not in contact with the stator cores at areas of the stator claw poles 1742 and 1752. This structure allows the resin to be present continuously from the gaps between the stator claw poles 1742 and 1752 at a given phase through the gaps between the stator claw poles 1742 and 1752 at another phase.

In addition, the stator core component members 174 and 175 are formed by filling a die with iron powder having undergone an insulation treatment and then compressing the iron powder. The stator core component members thus formed further undergo a magnetic annealing process. With the cores of the stator 17 constituted with the compressed powder as described above, the generation of an eddy current is inhibited and ultimately, the eddy current loss is reduced.

It is to be noted that the stator core component members 174 and 175 assume shapes that are substantially identical and thus, there is no need to use different dies.

Inside the stator core 172, the stator coil 173 is wound in a coil pattern in the circumferential direction along the outer circumferential portions 1741 and 1751. An insulating coating such as varnish is applied to the surface of the stator coil 173 and a terminal of the stator coil 173 is connected to a terminal of the rectifier 15 through the area between the stator claw poles 1742 and 1752 at the stator core 172.

It is to be noted that an insulating member constituted with insulating paper may be disposed between the stator core 172 and the stator coil 173.

The individual phase stators constituting the stator 17 in the embodiment are identical to one another and the phase stators are firmly positioned by disposing the non-magnetic link plates 18 between the individual phase stators set with an offset of 120° in the electrical angle and tilling the gaps between the stator claw poles 1742 and 1752 with resin.

The operations executed in the embodiment are now described.

As the engine is started, its rotation is transmitted from the crankshaft to the pulley 9 via the belt and, as a result, the rotor 12 constituting the rotating element is caused to rotate via the shaft 8. In this situation, a direct current from the brushes 11 is supplied via the slip rings 10 to the field coil 14 disposed at the rotor 12, thereby generating a magnetic flux circling along the inner circumference and the outer circumference of the field coil 14, which, in turn, results in the rotor claw poles 12*b* at the rotor 12 alternately assuming N polarity and S polarity along the circumferential direction.

The magnetic flux induced at the field coil 14 travels from the rotor claw poles 12*b* with N polarity at the front-side rotor member 12F through the stator claw poles 1742 and 1752 extending from one side of the stator 17 along the axial direction, circles around the stator coil 173 and reaches the stator claw poles 1742 and 1752 extending from the other side of the stator along the axial direction.

As the magnetic flux reaches the rotor claw poles 12*b* with S polarity at the rear-side rotor member 12R, a magnetic circuit circling through the rotor 12 and the stator 17 is formed. Since the magnetic flux generated at the rotor interlinks with each stator coil 173, an induction voltage is generated at the stator coil 173 corresponding to a specific phase, i.e., the U-phase, the V-phase or the W-phase. Overall, induction voltages corresponding to the three phases are generated.

The AC voltages thus generated undergo full wave rectification at the rectifier 15 and are thus converted to direct voltages. The direct voltages resulting from the rectification are regulated by an IC regulator (not shown) that controls the electric current supplied to the field coil 14 so as to achieve a uniform level of approximately 14.3V.

In addition, while the rotor 12 rotates, the front fan 13F and the rear fan 13R also rotate together with the rotor 12, and thus, an air current through which the outside air taken in through the inner circumferential side along the axial direction is let out toward the outer circumference, as indicated by the dotted line arrows in FIG. 1, is created.

As the front fan 13F rotates, the outside air is taken in along the axial direction through the air holes 3 present on the inner circumferential side at the front bracket 1, formed over the outer circumferential portion of the ball bearing 7*a*. The air thus taken in flows through toward the outer circumference due to centrifugal force generated by the blades of the front fan 13F and the air is then let out through the outer circumferential-side air holes 3 formed on the outer circumferential side of the front bracket 1 where a greater wall thickness is assumed. Since one side surface of the stator 17 along the axial direction and the outer circumferential surface of the stator 17 are locked in contact with the front bracket 1, any heat generated at the stator 17 is fully transmitted to the front bracket 1. Since the area of the front bracket 1 to which the heat is transmitted is located at a position facing the area where the air flows toward the outer circumferential-side air holes 3, the stator 17 can be cooled efficiently.

As the rear fan 13R rotates, the outside air is taken in along the axial direction through the inner circumferential-side air holes 3 at the rear bracket 2 formed over the outer circumferential portion of the ball bearing 7*b*, via the air holes 3 formed at the edge of the rear cover 5 on the outer circumferential side, the inner circumferential-side air holes (not shown) opening at the end surface of the rear cover 5 along the axial direction and then the rectifier 15. The air thus taken inflows toward the outer circumference due to the centrifugal force generated by the blades of the rear fan 13R and is then let out through the outer circumferential-side air holes 3 located on the outer circumferential side of the rear bracket 2. Thus, as in the case of the front bracket 1, heat generated from the stator 17 and the heat originating from the stator 17 and transmitted to the rear bracket 2 are cooled by the air flowing toward the outer circumferential-side air holes 3.

In addition, the pressure difference between the pressure at the front fan 13F and the pressure at the rear fan 13R, which is bound to manifest as the fans rotate, allows air to flow through the gaps between the magnetic poles at the rotor 12 and the gap between the rotor 12 and the stator 17.

In the embodiment, the greater pressure is generated at the rear fan 13R and, as a result, air flows from the front bracket 1 through the gap between the rotor 12 and the stator 17 and the gap between the magnetic poles at the rotor 12 toward the rear bracket with the air flowing in this air current, the rotor 12 and the stator 17 are cooled.

The stator coils in the first embodiment are each wound around in a coil pattern on the outer circumferential side of the rotor, which greatly improves the efficiency of the winding installation work, improves the space factor and reduces the coil resistance through the elimination of coil ends.

In addition, since the rotor includes a field coil, the field magnetic flux can be adjusted in correspondence to specific purposes of use, which, in turn, facilitates external control.

Since the stator claw poles in the embodiment are skewed relative to the axial line, the magnetic flux induced at the rotor can be interlinked smoothly and thus, magnetic noise can be reduced.

Furthermore, the embodiment is characterized in that the rotor claw poles assume an unvarying width measured along the circumferential direction at least over their areas facing opposite the field coil. Compared to a structure that includes rotor claw poles tapering along the circumferential direction, this structure allows the magnetic flux induced via the field coil to be interlinked more easily and thus, a higher level of voltage can be induced.

In the embodiment, the base portions of the rotor claw poles assume a greater width relative to the middle portions of the rotor claw poles, the middle portions assume a greater width than the front end portions and the middle portions are substantially unvarying in width. While magnetic saturation tends to occur readily over the base portions when the middle portions assume a substantially uniform width in order to ensure that there is no significant difference among the sizes of the areas facing opposite the stators in the individual phases sat side-by-side along the axial direction, the extent of magnetic saturation is lessened by assuming a greater width over the base portions and the strength of the magnetic flux can be increased. In addition, while the magnetic flux tends to leak readily due to the narrowness of the gaps between adjacent rotor claw poles when the base portions are simply wider, the width of the front end portions is set smaller than the middle portions in the embodiment so as to secure ample gaps between the adjacent rotor claw poles even with the wide base portions.

The structure achieved in the embodiment includes a rundle type rotor equipped with a field coil and 16 magnetic poles and a stator including phase stators, each constituted with a stator core disposed at a position facing opposite the outer circumference of the rotor and a stator coil wound inside the stator core. The stator coil is wound around in a coil pattern on the outer circumferential side of the rotor and the stator core includes 16 stator claw poles disposed at a position facing opposite the rotor and alternately extending from the two sides along the axial direction.

It is to be noted that while the level of the induction voltage can be raised by providing a greater number of magnetic poles, significant leakage flux is bound to occur if the rotor includes an excessively large number of magnetic poles since those magnetic poles will be set close to each other. Under such circumstances, the effective magnetic flux passing through the stator side will decrease to result in a reduction in both output and efficiency.

Accordingly, the inventors of the present invention discovered that the number of poles at the rotor that assures both high output and high efficiency as a rotating electrical machine is in the range of 12 through 24. They also confirmed that the output can be improved by providing 12~24 magnetic poles at the stator, in keeping with the number of magnetic poles at the rotor.

The rotor claw poles in a rundle type rotor become deformed due to centrifugal force giving rise to problems such as contact with the stator, a core shift and damage to the claw poles. However, it has been learned that when magnetic poles are formed at the rotor in a larger quantity without exceeding 24, the measurement of the base portions of the magnetic poles along the circumferential direction and the measurement of the magnetic poles themselves along the circumferential direction are both reduced and the weight of the individual claw poles decreases in proportion to the number of poles, which keeps down the level of stress and the extent of deformation attributable to centrifugal force. It is to be noted that a further improvement in output characteristics can be achieved by forming 16~24 poles at the rotor and that the greatest improvement in output can be achieved by providing 16 poles at the rotor.

A similar tendency to that with regard to the number of magnetic poles at the rotor has also been observed with regard to the number of magnetic poles at the stator. In other words, it has been learned that the optimal number of poles to be formed at the stator is 16~24. In particular, the greatest improvement in output can be achieved by forming 16 magnetic poles at the stator, matching the optimal number of magnetic poles at the rotor. Based upon these findings, 16 magnetic poles are formed at the rotor and also 16 magnetic poles are formed at the individual phase stators in the embodiment.

The front bracket in the embodiment assumes a small wall thickness on the side toward the rear bracket over the outer circumferential area along the radial direction and assumes a large wall thickness at the bottom surface. The front bracket formed as described above is then fitted with the rear bracket. This means that an external force applied to the rotating electrical machine will be absorbed at the front bracket and the rear bracket so as to reduce the force applied to the stator.

In addition, the individual phase stators are disposed so that at least their outer circumferences are in contact with the stages formed over the outer circumferential areas of the front bracket and the rear bracket along the radial direction where they assume a large wall thickness and sufficient heat releasing area is assured by forming air holes through which air flows at the areas with the large wall thickness. Thus, the heat generated at the stator is transmitted to the brackets and the stator can be cooled thoroughly.

Since air supplied from the air supply means flows through the air holes, better cooling effect is assured. Since the front bracket and the rear bracket are fitted together via their fitting portions constituted with the stage formed at the outer circumference and the stage formed at the inner circumference, heat can be exchanged readily between the front bracket and the rear bracket.

Since the stator is in contact over a great area with the front bracket, which includes the portion with the large wall thickness, the stator can be cooled with ease. It is to be noted that cooling fins may be formed inside the air holes so as to further improve the cooling effect.

Furthermore, the stator coils in the individual phase are connected to the rectifier through the gaps between the stator claw poles in the embodiment and no holes need to be formed at the stator cores for purposes of stator coil connection. This means that a rotating electrical machine, in which the magnetic circuit is not adversely affected, can be provided at low cost. It is to be noted that then on-magnetic resin filler in the gaps between the stator claw poles also holds the stator coils in place. In other words, the phase stators corresponding to the various phases and the stator core component members can be locked together with the resin filler.

Moreover, the presence of the resin improves the mechanical strength of the stator including the stator claw poles. Since the resin is poured so that its surface is substantially flush with the stator claw poles, rotor howl is reduced in the embodiment. It is to be noted that the surfaces of the stator claw poles should remain uncoated with resin so as to minimize the distance from the rotor and allow the magnetic flux to flow more freely.

Second Embodiment

As illustrated in FIG. 7, the stator core component members 174 and 175 assume a substantially unvarying thickness over their outer circumferential surfaces except for where the projecting portions 1744 and 1754 and the recessed portions 1745 and 1755, at which the stator core component members are to be fitted together, are present. The following is a description of the flow of magnetic flux generated at the rotor 12 in the rotating electrical machine assuming this structure.

Figure 8:
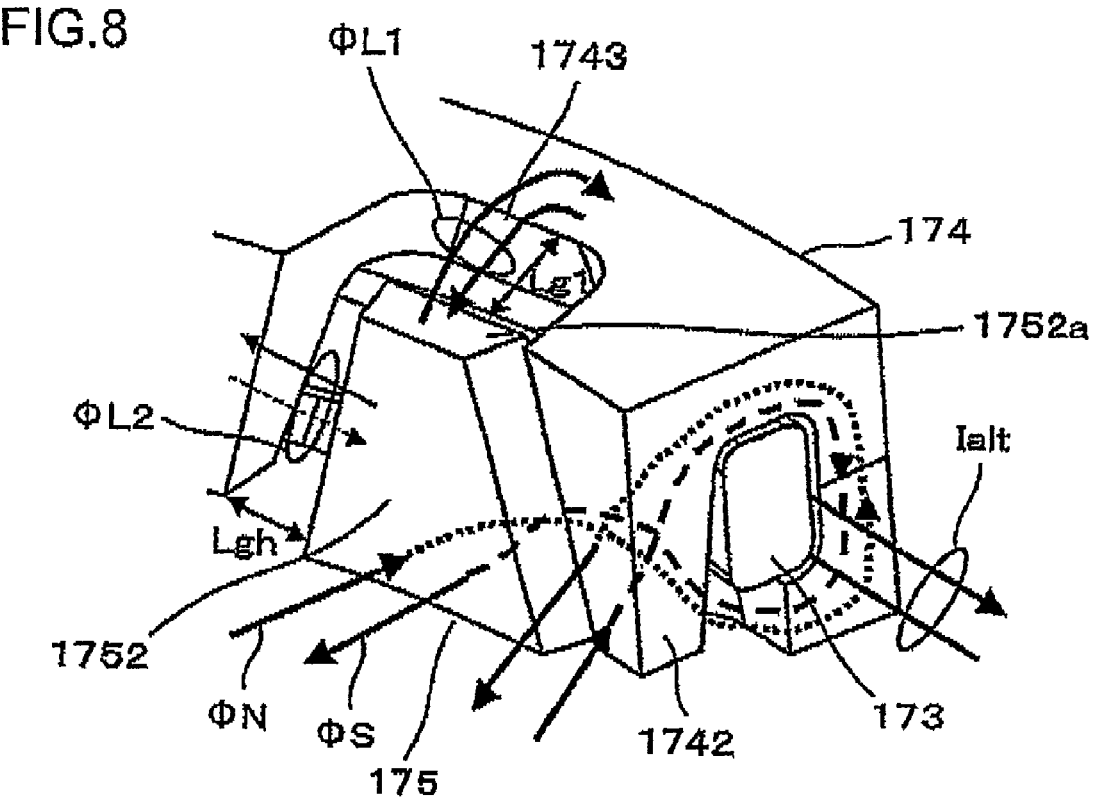
FIG. 8 illustrates interlinking magnetic fluxes at the stator.

FIG. 8 shows the stator core component member 175, one of its stator core magnetic poles 1752, the stator core component member 174, one of its stator core magnetic poles 1742 and part of the stator coil 173.

In the first embodiment, magnetic fluxes alternately assuming N polarity and S polarity are generated at the rotor claw poles 12b extending from the front-side rotor member 12F and the rear-side rotor member 12R and these magnetic fluxes interlink with the stator claw poles 1742 and 1752. As the rotor rotates, the magnetic fluxes change over time and circle through magnetic paths formed with the stator cores 172 located on the outer circumferential side of the stator coils 173, thereby generating AC induction voltages at the stator coils 173.

In FIG. 8, showing two stator claw poles 1752 and 1742 set next to each other, the flows of a magnetic flux ØN assuming N polarity and a magnetic flux ØS assuming S polarity at the rotor claw pole 12b facing opposite the stator claw pole 1752 are indicated. For the magnetic flux ØN with N polarity, a magnetic path is formed through the stator claw pole 1752, the adjacent stator claw pole 1742 and the S pole at the rotor claw pole 12b, whereas for the magnetic flux ØS with S polarity, a magnetic path is formed through the stator claw pole 1742, the adjacent stator claw pole 1752 and the N pole at the rotor claw pole 12b. As the rotor 12 continuously rotates, the magnetic fluxes ØN and ØS alternately circle around the stator coil 173, thereby inducing an AC voltage and causing an AC current Ialt to flow through the stator coil 173.

As the AC current Ialt flows through the stator coil 173, a magnetic flux ØL to circle around the stator coil 173 is generated. This magnetic flux ØL is assumed to travel through the following two magnetic flux paths. Namely, a magnetic flux ØL2 will travel through the gap between the stator claw poles 1752 and 1742 along the circumferential direction (from the stator claw pole 1752 to the rotor claw pole surface via the gap and then travel from the rotor magnetic pole surface via the gap to pass through the rotor claw pole 1742) and then pass through a magnetic path circling around via the stator core component member 174 and the stator core component member 175, and a magnetic flux ØL1 will travel through a magnetic path extending from the front end portion 1752a through the gap between the front end portion and the stator core component member 174 facing opposite the front end portion to the stator core component member 174 and then to the stator core component member 175.

This means that the magnetic flux ØL generated by the electric current flowing through the stator coil 173 represents the sum of ØL1 and ØL2. The strength of the magnetic flux ØL2 is dependent upon the range of the gap Lgh measured along the circumferential direction.

Figure 9A:
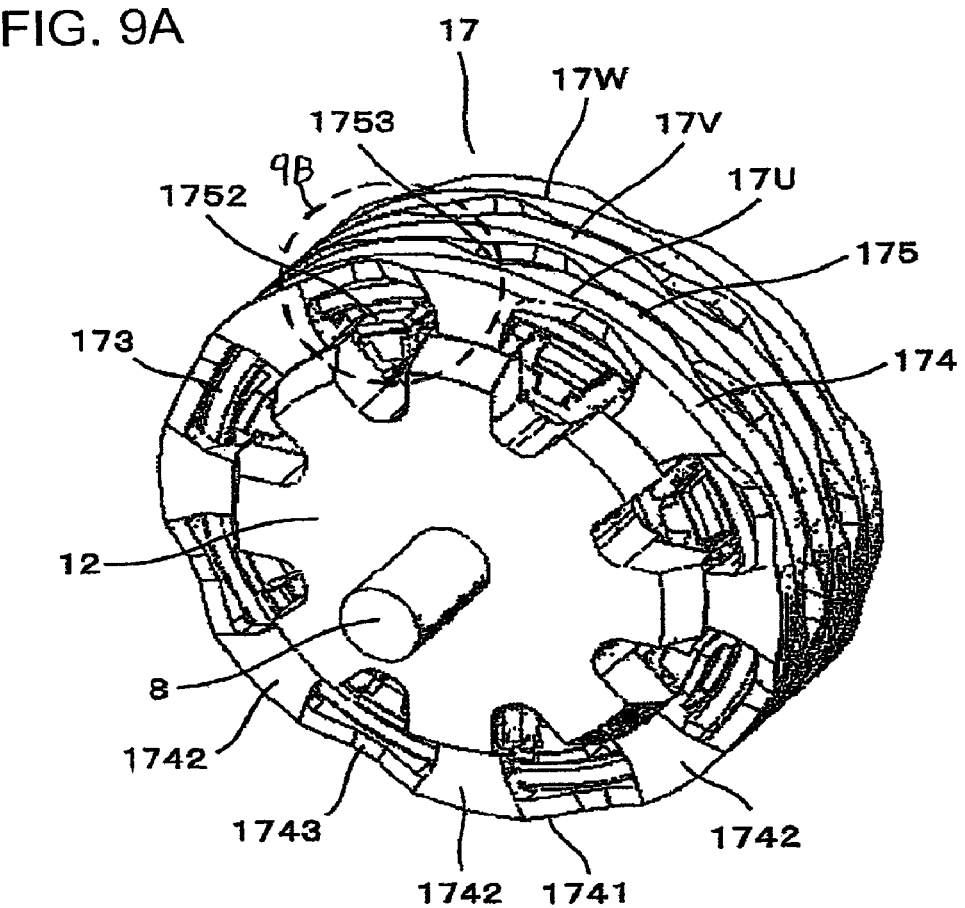
FIG. 9A is a perspective of the rotor/stator assembly achieved in a second embodiment.

The change rate ΔØL/Δt with regard to the change in the air-gap flux ØL represents the resistance in the AC current, i.e., the reactance. A voltage decrease occurs through a connection equivalent to a serial connection to the stator coil 173 and the induced AC voltage is reduced by an extent corresponding to the decrease in the voltage. This reduction in the voltage, the extent of which is equivalent to the reactance, occurs at each stator claw pole. Thus, the extent of the voltage reduction is multiplied by a factor of 16 at each of the U-phase stator 17U, the V-phase stator 17V and W-phase stator 17W constituting the stator 17, each equipped with 16 magnetic poles as shown in FIG. 9A. In addition, as the rotor 12 rotates at a higher rotation rate, the change rate ΔØL/Δt of the air-gap flux ØL increases and thus the reactance also increases, hindering the full output of the power generated at the higher rotation rate to result in lowered output.

It is known based upon magnetic theory that the quantity of the air-gap flux ØL, which induces the reactance, is in reverse proportion to the gap distance Lg. The magnetic flux ØL2 decreases when the gap distance Lgh measured along the circumferential direction is greater and the magnetic flux ØL1 also decreases when the gap distance Lg1 is greater.

Accordingly, the air-gap flux ØL1 flowing from the front end portion 1752a of the stator claw pole 1752 toward the portion 1743 facing opposite the stator core component member 175 shown in FIG. 8 is reduced by assuming a greater gap distance Lg1 in the second embodiment.

Figure 9B:
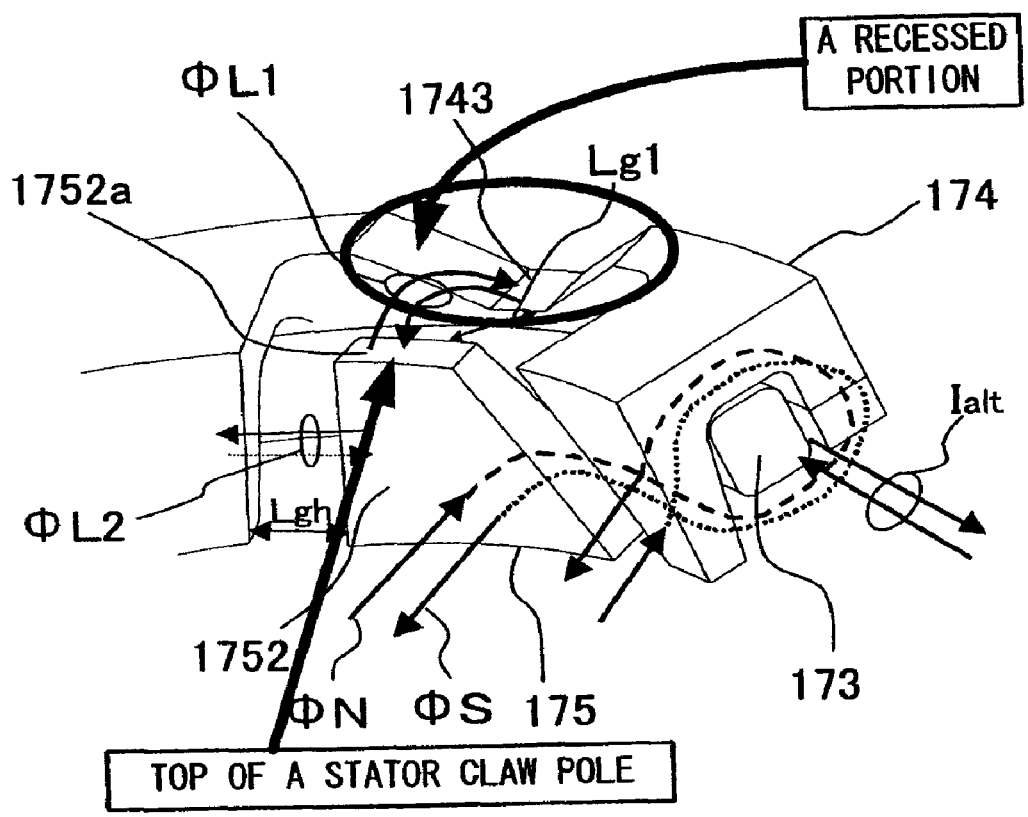
FIG. 9B is an enlarged view of a portion of the rotor/stator assembly Shown in FIG. 9A.
Figure 10:
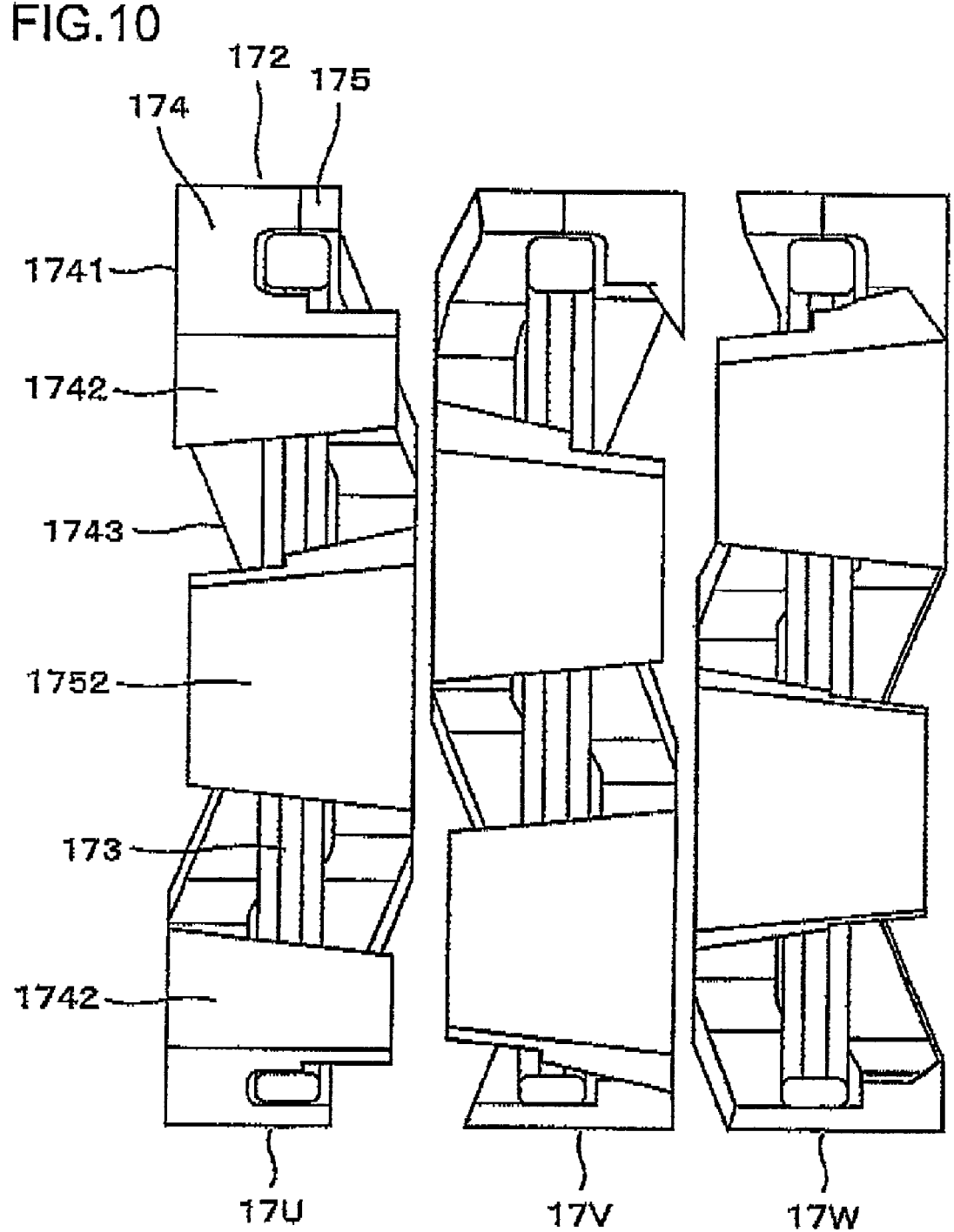
FIG. 10 shows the stator achieved in the second embodiment viewed from the inner radius side.

FIGS. 9A, 9B, 10 and 11 illustrate the second embodiment. The same reference numerals are assigned to parts identical to those in the first embodiment. FIG. 9 shows the assembly of the stator 17 constituted with the U-phase stator 17U, the V-phase stator 17V and the W-phase stator 17W, the rotor 12 and shaft 8, FIG. 10 shows the stator 17 viewed from the inner circumferential surface. FIG. 11A shows one of the stator claw poles corresponding to a given phase, viewed from the inner circumferential surface, FIG. 11B is a sectional view of the stator claw pole in FIG. 11A and FIG. 11C presents a graph indicating the relationship between the gap distance ratio and the output current.

The stator 17 in FIGS. 9A and 10 is constituted with the U-phase stator 17U, the V-phase stator 17V and the W-phase stator 17W, with the stator claw poles at the individual phase stators positioned with an electrical angle offset of 120° in keeping with the pitch assumed at the rotor 12. Circular link plates constituted of non-magnetic resin material such as those shown in FIG. 6, are inserted between the individual phase stators, i.e., the U-phase stator 17U, the V-phase stator 17V and the W-phase stator 17W, and thus, the various phase stators are integrated via the link plates along the axial direction.

The structure of the stator 17 is now described in detail by focusing on the U-phase stator 17U in reference to FIGS. 9A and 10. It is to be noted that structural features and operations other than those explained below, including those of the rotor 12, are identical to those in the first embodiment.

The U-phase stator 17U is constituted with a stator core 172 and a stator coil 173 and the stator core 172 is split into two parts along the axial direction. The individual split stator core component members 174 and 175 respectively include outer circumferential portions 1741 and 1751 located on the outer circumferential side, assuming an annular shape and also assuming an L-shaped section along the radial direction and a plurality of (8) stator claw poles 1742 and a plurality of (8) stator claw poles 1752 located on the inner circumferential sides of the outer circumferential portions and assuming an L-shaped section along the radial direction. Thus, the stator core component members 174 and 175 as a whole each assume a U-shaped section along the radial direction. In addition, the side surfaces of the stator claw poles 1742 and 1752 along the circumferential direction slope relative to the line of the rotational axis. In other words, the stator claw poles are formed with a skew and assume a substantially trapezoidal shape with a tapered tip. The stator claw poles 1742 and 1752 are alternately disposed with an electrical angle offset of 180° along the circumferential direction. With eight stator claw poles 1742 formed at the stator core component member 174 and eight stator claw poles 1752 formed at the stator core component member 175, the phase stator 17U includes a total of 16 stator claw poles. As a result, the phase stator corresponding to each phase at the stator 17 in the second embodiment, too, includes 16 magnetic poles equal to the number of magnetic poles formed at the rotor 12.

At the stator core component members 174 and 175 constituting the U-phase stator 17U, recessed portions 1743 and 1753 are respectively formed along the axial direction, ranging from the areas where the stator claw poles 1742 and 1752 rise upward in an L shape, between the stator claw poles 1742 and between the stator claw poles 1752. In other words, the front end portions 1742a at the stator claw poles 1742 face opposite the recessed portions 1753 at the stator core component member 175, whereas the front end portions 1752a of the stator claw poles 175 face opposite the recessed portions 1743 at the stator core component member 174.

Figure 11A:
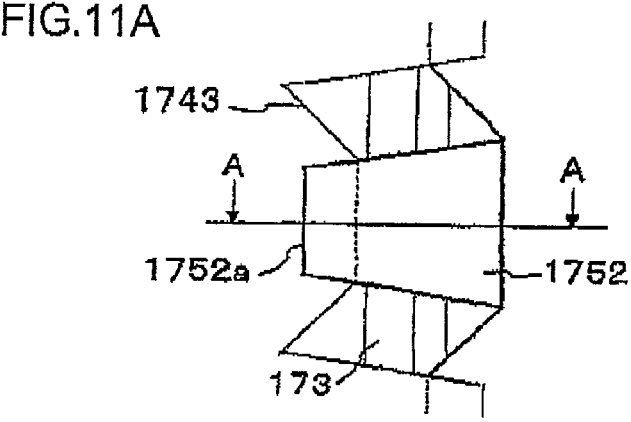
FIGS. 11A and 11B present views of a stator claw pole achieved in the second embodiment taken from the inner radius side and through a section taken at the center.
Figure 11B:
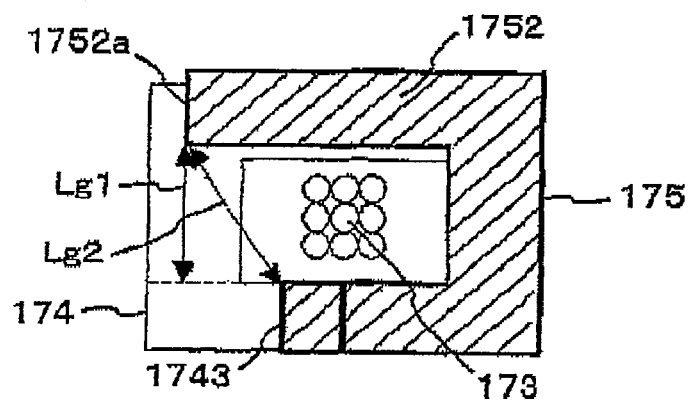

FIG. 11A shows a stator claw pole 1752 viewed from the inner diameter side and FIG. 11B presents a sectional view taken through the center A-A along the axial direction. As FIG. 11B indicates, the stator core component members 174 and 175 each assume a substantially U shape, and the stator coil 173 is disposed in the inner space formed by the U-shaped stator core component members.

The gap distance Lg from the front end portion 1752a of the stator claw pole 1752 at the stator core component member 175 to the stator core component member 174 is Lg2 greater than the distance Lg1 in the first embodiment (assuming the structure with no recessed portion present at the rear surface of the stator core component member, i.e., the recessed portion does not extend beyond a middle point at the stator core component member along the axial direction) since the recessed portion 1743 extends to the rear surface of the stator core component member in the structure described in detail in reference to FIGS. 8 and 11A. As explained earlier, the air-gap flux ØL is reduced when a greater gap distance Lg is assumed. A reduction in the air-gap flux ØL, in turn, reduces the change rate ΔØL/Δt of the air-gap flux corresponding to the rotation rate at the rotor 12, i.e., the reactance, which minimizes the decrease in the output of power generated at a higher rotation rate.

Figure 11C:
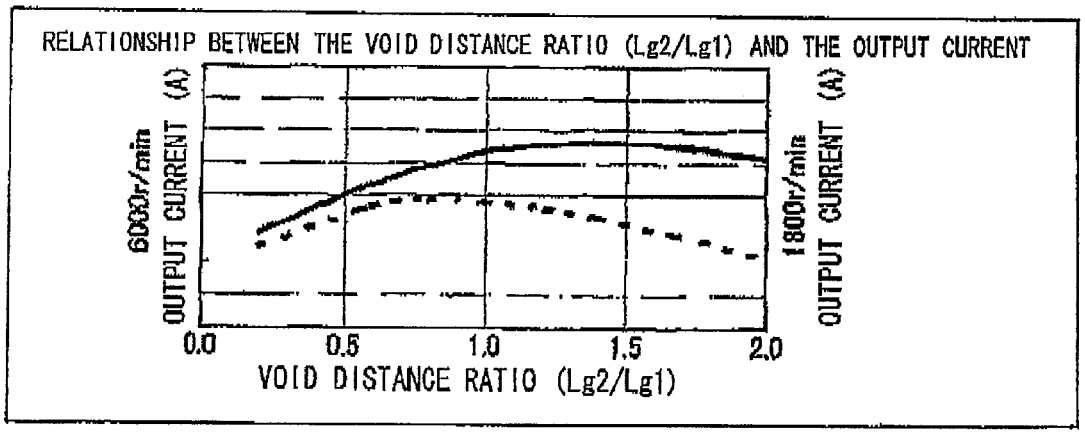
FIG. 11C presents a graph indicating the relationship between the gap distance and the output current.

The results of tests conducted by the inventors of the present invention to determine the relationship of the output current to the gap distance ratio representing the ratio of gap distance Lg2 and the height Lg1 of the stator coil 173 measured along the radial direction, as shown in FIG. 11(b) are presented in FIG. 11C.

FIG. 11C indicates that the optimal gap distance ratio is in the range of 0.5~1.5 when the rotation speed at the rotor is 1800 rpm. In addition, when the rotor rotates at 6000 rpm, the output current is affected by the reactance to a greater extent and thus, the output current achieves the highest level within a gap distance ratio (Lg2/Lg1) range of 1.0~2.0. The alternator for vehicle achieved in the embodiment is expected to be engaged in operation over a wide rotation rate range including the rotation rate of 1800 rpm and the rotation rate of 6000 rpm. It is thus crucial that desirable output characteristics be achieved over the entire operating range. Overall, desirable conditions at both high rotation rates and low rotation rates correspond to the gap distance ratio (Lg2/Lg1) in a range of 0.8~1.5. As long as the gap distance ratio is within this range, desirable output characteristics are achieved both in the low rotation speed range and in the higher rotation speed range. In addition, if the rotor rotates at a high speed equal to or greater than 6000 rpm, a high output current can be obtained by setting the gap distance ratio (Lg2/Lg1) to 1.5 or greater.

FIG. 11C indicates that the output current level peaks with the gap distance ratio (Lg2/Lg1) in a range of 0.6~1.0 when the rotor rotates at 1800 rpm. Relative to the highest output current level, the output current decreases as the ratio (Lg2/Lg1) becomes closer to 0 and a major cause for this decrease in the output current is assumed to be an increase in the reactance. The output current also becomes lower relative to its highest level as (Lg2/Lg1) increases. A major cause for this decrease is assumed to be a reduction in the magnetic flux resulting from an increase in the magnetic reluctance. These factors should all be taken into consideration.

In the second embodiment, the gap distance Lg1 from the stator claw poles 1742 and 1752 to the stator core component members 175 and 174 on the opposite sides is increased and, as a result, the air-gap flux ØL1 is reduced. Consequently, the extent of change occurring over time in the air-gap flux ØL generated with the electric current flowing through the stator coil 173 is reduced, which, in turn, reduces the reactance the relation of which to the stator coil 173 is equivalent to a serial connection. Thus, the level of power output is not lowered.

In addition, since gaps are formed near the stator coil 173, as shown in FIGS. 9A, 9B and 10, a cooling air passage is formed and thus, the temperature of the stator coil 173 does not rise readily.

It is to be noted that the stator 17 in the three-phase AC generator is achieved by integrating along the axial direction the U-phase stator 17U with the V-phase stator 17V and the W-phase stator 17W, each constituted with stator core component members identical to those of the U-phase stator 17U, as shown in FIG. 9A.

Figure 12A:
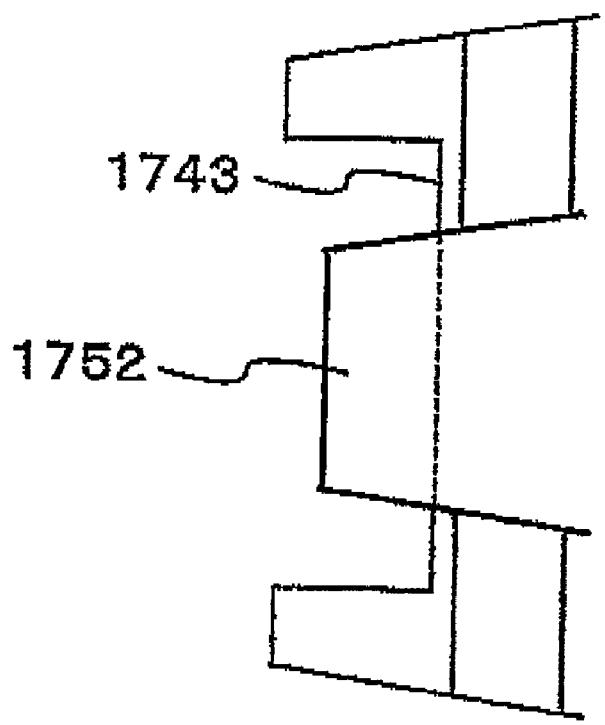
FIGS. 12A and 12B show shapes that the stator claw poles may assume in the second embodiment, in views taken from the inner radius side.
Figure 12B:
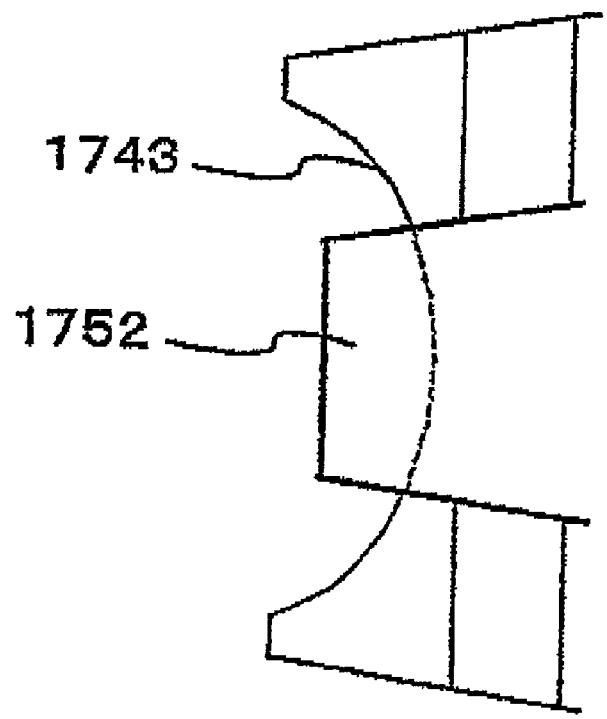

FIGS. 12A and 12B illustrate alternative shapes that may be assumed at the recessed portions of the stator core component members 174 and 175 constituting the U-phase stator 17U. While the recessed portion in FIG. 11A assumes a trapezoidal shape, the recessed portion in FIG. 12A assumes a rectangular shape and the recessed portion in FIG. 12B assumes an arc shape. By adopting either of the shapes shown in FIGS. 12A and 12B, operational effects similar to those of the recessed portion in FIG. 11A are realized.

Third Embodiment

Figure 13:
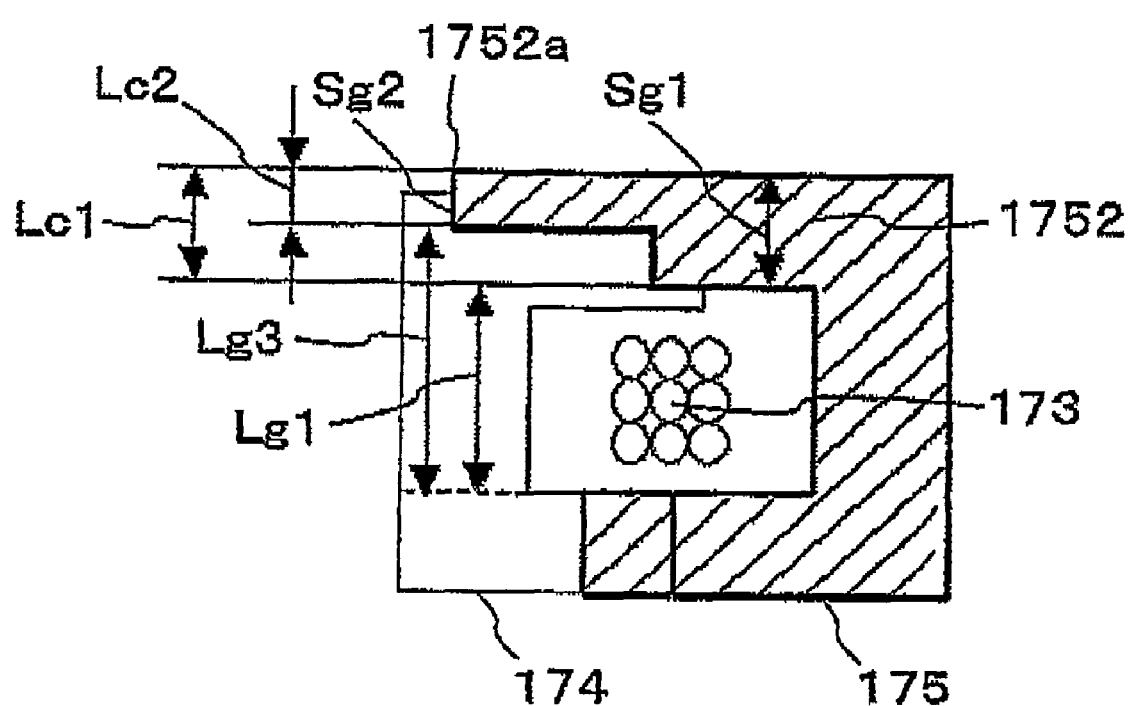
FIG. 13 is a sectional view of a stator claw pole achieved in a third embodiment taken at the center thereof.

FIG. 13 shows a stator claw pole 1752 achieved in the third embodiment of the present invention in a sectional view similar to that presented in FIG. 11B taken through the central area A-A along the axial direction.

Magnetic theory indicates that the quantity of the air-gap flux ØL corresponding to the reactance described in reference to the second embodiment is in proportion to the gap distance Lg and also in reverse proportion to the sectional area Sg of the magnetic core facing the gap.

Accordingly, the thickness of the stator claw pole 1752 in FIG. 13 at the surface facing opposite the stator coil 173 is adjusted over two stages, Lc1 and Lc2, with the smaller thickness Lc2 assumed at the front end portion 1752a of the claw pole. As a result, the stator claw pole 1752 is formed with the front end portion 1752a thereof assuming a smaller sectional area Sg2 than the sectional area Sg1 assumed on the base side of the stator claw pole 1752. It is to be noted that since the stator claw pole 1752 has a skew, which makes the side surfaces of the stator claw pole along the circumferential direction slope relative to the line of the rotational axis, the sectional areas are not in proportion to the thicknesses Lc1 and Lc2. Structural features and operations in the third embodiment other than the specific shape of the stator claw pole 1752 are identical to those of the second embodiment, and the same reference numerals are assigned to identical structural elements.

Since a smaller sectional area Sg2 is assumed at the front end portion 1752a of the stator claw pole, the air-gap flux ØL1 is reduced. Consequently, the extent of change occurring over time in the air-gap flux ØL generated with the electric current flowing through the stator coil 173 is reduced, which, in turn, reduces the reactance the relation of which to the stator coil 173 is equivalent to a serial connection. Thus, the level of power output is not lowered.

In addition, by adopting the staged shape, the gap distance Lgh measured along the circumferential direction and the sectional area at the side surfaces of the stator claw poles 1742 and 1752 corresponding to the vertical plane are all reduced, which, in turn, reduces the magnetic flux ØL2. Consequently, the level of power output at high rotation speed does not decrease.

It is to be noted that as the thickness of the claw pole 1752 is made on the side facing the stator coil 173, the gap distance from the front end portion 1752a to the stator core component member 174 facing opposite the front end portion is increased from Lg1 to Lg3 in the structure illustrated in FIG. 13, achieving an effect that works synergistically with the advantages achieved in the first embodiment.

In addition, since gaps are formed near the stator coil 173, a cooling air passage is formed and thus, the temperature of the stator coil 173 does not rise readily.

Figure 14A:
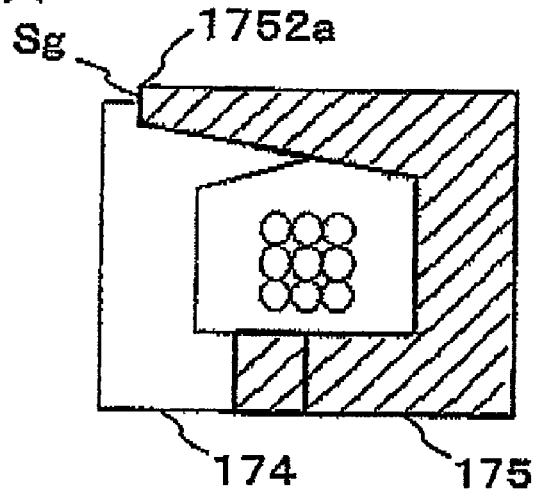
FIGS. 14A to 14C show shapes that the stator claw poles may assume in the third embodiment in sectional views taken through the center.
Figure 14B:
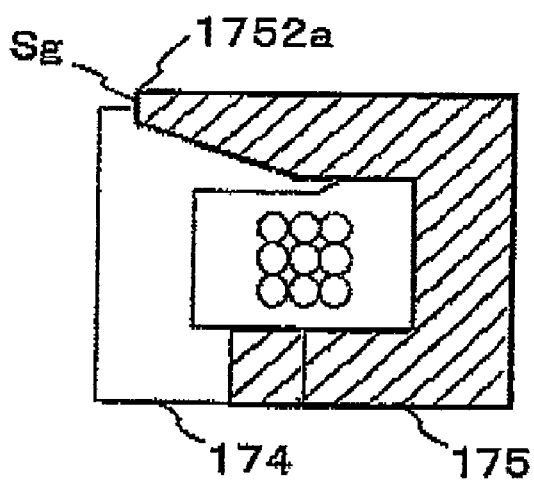
Figure 14C:
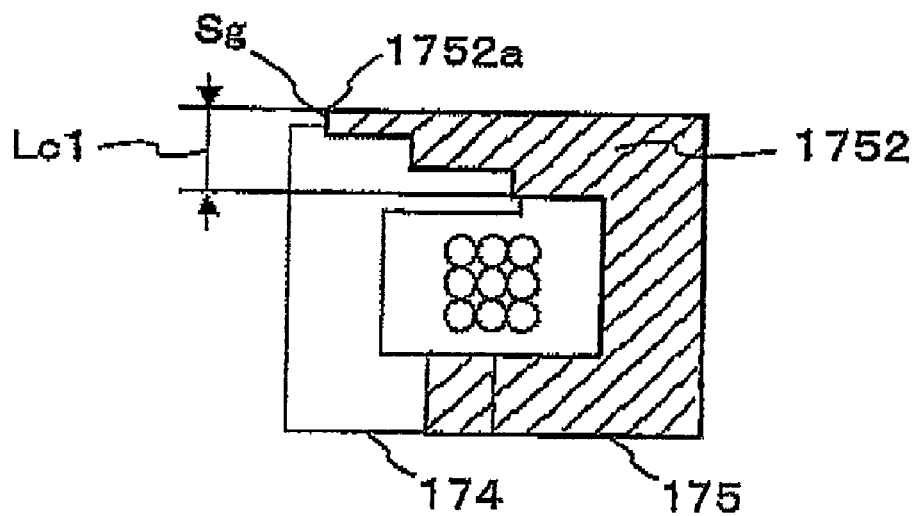

FIGS. 14A to 14C show alternative shapes that may be assumed in order to reduce the sectional area at the front end portion 1752a of the stator claw pole. FIG. 14A shows a stator claw pole 1752 assuming a thickness that becomes continuously smaller on the side facing the stator coil 173 toward the front end portion 1752a, FIG. 14B shows a stator claw pole 1752 assuming a thickness which starts to decrease continuously from the halfway point of the stator claw pole, and FIG. 14C shows a stator claw pole 1752 assuming a thickness that becomes smaller over three stages.

Operational effects similar to those of the structure shown in FIG. 13 are achieved by adopting any of the shapes shown in FIGS. 14A to 14C.

When the thickness of the stator claw pole 1752 is reduced, as shown in FIGS. 13 and 14A to 14C, the sectional area of the side surfaces of the stator claw poles 1752 and 1742 set side-by-side and facing opposite each other is reduced as has been explained in reference to FIG. 8.

A magnetic core has the maximum magnetic flux density in a hysteresis loop and the saturation magnetic flux density is reached at a smaller magnetic flux density when the sectional area is smaller. For this reason, when the sectional area is reduced as described above, saturation may occur at the stator claw poles 1752 and 1742, depending upon the magnetic fluxes ØN and ØS used to induce the AC voltage. Under such circumstances, a specific level of AC voltage may not be generated. Accordingly, it is desirable to assure an ample sectional area for the side surfaces of adjacent stator claw poles 1752 and to determine a specific shape for the sectional area Sg at the front end portion 1752a, as disclosed in FIGS. 13 and 14A to 14C to ensure that saturation attributable to the magnetic flux induced at the rotor claw pole 12b in FIG. 4 does not occur.

While the second and third embodiments have been described separately, the features characterizing the two embodiments may be adopted in combination to further reduce the air-gap flux ØL.

While no special mention is made in the description of the second and third embodiments with respect to a base material that may be used to constitute the stator cores 172, the stator cores may be manufactured by using a base material constituted of iron powder that facilitates the forming process. Such iron powder should first undergo insulation treatment, be charged into a die and then be compressed. The iron powder material should then undergo magnetic annealing. Alternatively, the stator cores may be manufactured by using a magnetic material that will effectively reduce eddy currents, such as a material formed by laminating electromagnetic steel sheets. When forming the staged stator claw pole 1752 in FIG. 14C by adopting a laminated structure, steel sheets may be layered one on top of another along the circumferential direction with varying numbers of steel sheets layered in the various stages.

Structures that may be adopted in conjunction with the present invention as alternatives to those described in reference to the various embodiments of the present invention are listed below.

While an explanation has been given in reference to the embodiments on an example in which the rotating electrical machine according to the present invention is adopted in an alternator for vehicle, the present invention is not limited to this example and it may also be adopted in a motor that outputs a rotational force, a motor generator that functions both as a power generating unit and a drive unit, and the like. The motor applications, in particular, include those as drive motors in hybrid cars and electric four-wheel-drive vehicles, as motors used to drive pumps and the like.

While the wall thickness over the outer circumferential side area along the radial direction is set greater than the wall thickness of the bottom area only at the front bracket 1 in the first, second and third embodiments, the rear bracket 2 may also assume a greater wall thickness over the outer circumferential side area along the radial direction relative to the wall thickness at its bottom portion, as long as there is sufficient installation space. By assuming a structure similar to that of the front bracket 1 at the rear bracket 2, the stator 17 can be cooled even more effectively. It is to be noted that the heat releasing area can be further increased by forming fins or recesses/projections at the internal circumferential surfaces of the air holes 3 present on the outer circumferential side along the radial direction facing opposite the stages 16F and 16R of the two brackets, which fit with the ends of the stator 17 along the axial direction. In such a case, even better cooling effect can be achieved.

In addition, while the rotor claw poles 12b each include a base portion 12b-1, a middle portion 12b-2 and a front end portion 12b-3 formed therein in the first, second and third embodiments, the rotor claw poles may instead assume a continuous inclination sloping from the base portion 12b-1 toward the front end portion 12b-3. As an alternative, the rotor claw poles may have a uniform width along the circumferential direction from the base portion 12b-1 through the front end portion 12b-3. Furthermore, a plurality of circumferential grooves may be formed to prevent an eddy current at the outer circumferential-side surfaces of the rotor claw poles 12b.

While the first, second and third embodiments have been described by assuming that the stator 17 is a three-phase stator, the present invention may be adopted in conjunction with a stator having more than three phases. It will be obvious that when the present invention is adopted in conjunction with a stator having a number of phases other than three, the electrical angle by which the individual phases are offset relative to each other must be adjusted from 120° in correspondence to the number of phases.

While no mention is included in the description of the first, second and third embodiments with respect to a specific shape that the section of the wire in the stator coils 173 may assume, the coil section may be circular or rectangular. It is to be noted that the stator coils 173 should assume a quadrangular section in order to improve the space factor within the stator cores 172. The section may be either rectangular or square. Such a stator coil 173 should be installed in a stator core 172 with a quadrangular stator coil installation arrangement in keeping with the quadrangular section assumed at the stator coil 173.

While the recessed portions 171 are formed at the stator cores 172 and the projecting portions 181 are formed at the link plates 18 in the first, second and third embodiments, so as to position the stator cores 172 corresponding to the individual phases and the link plates 18 relative to each other along the circumferential direction, they may be positioned by using a special positioning jig or markings instead of the recessed portions 171 and the projecting portions 181. If no recessed portions 171 are formed at the stator cores 172, the magnetic path area will remain constant without becoming reduced at any particular position.

Furthermore, while the resin is charged to fill the gaps between the stator magnetic poles 1742 and 1752 in order to fix together the individual phase stators into an integrated stator 17 in the first, second and third embodiments, a non-magnetic material such as resin may be used to mold the stator 17 into en integrated package. By molding the entire stator 17 as described above, the individual phase stators can be integrated effectively and the compressed soft magnetic composite constituting the cores, which does not assure high strength, will be reinforced for better vibration resistance and greater strength. However, it is desirable that the stator claw poles 1742 and 1752 on the inner circumferential side, i.e., the areas facing opposite the rotor 12, remain unmolded so as not to form a greater gap between the stator tabs and the rotor 12.

While the stator claw poles 1742 and 1752 are skewed on both sides along the circumferential direction and thus assume a substantially trapezoidal shape in the first, second and third embodiments, they may instead assume a skew only on the side opposite from the direction in which the rotor 12 rotates, for purposes of magnetic noise reduction. With such a skew formed at the stator claw poles 1742 and 1752 only on one side thereof, the magnetic noise can still be effectively reduced and, at the same timer the area of the stator claw poles 1742 and 1752 facing opposite the rotor 12 can be increased. Consequently, magnetic fluxes will be formed more readily between the stator 17 and the rotor 12 to raise the levels of the induction voltages.

The stator core component members 174 and 175 achieved in the first, second and third embodiments are formed by charging iron powder having undergone insulation treatment into a die, compressing the iron powder and then subjecting the compressed molding to magnetic annealing. In other words, the stator 17 includes compressed soft magnetic composite. The stator 17 may instead adopt a laminated structure achieved by layering steel sheets one on top of another in order to reduce eddy currents. Such steel sheets may be, for instance, electromagnetic steel sheets (silicon steel sheets).

While the areas between the stator claw poles 1742/1752 and the stator core component members 175/174 facing opposite the stator claw poles are left as voids in the first, second and third embodiments, similar operational effects will still be achieved even when these voids are connected via a non-magnetic material.

Next, further variations of the various embodiments described above and their operational effects are explained below.

(1) In the rotating electrical machine, the stator includes stator cores corresponding to a plurality of phases and disposed side-by-side along the axial direction and the stator coil disposed in correspondence to each of the stator cores. A plurality of stator core sets, each made up with stator cores corresponding to the plurality of phases set side-by-side along the axial direction and a stator coil disposed in correspondence to each stator core, are installed in the stator so that stator cores corresponding to the different phases in the plurality of stator core sets are set in uniform order along the axial direction and the stator coils corresponding to a given phase are connected to one another in series.

(2) In the rotating electrical machine, the stator is held along the axial direction by a bracket with at least one end of the stator along the axial direction placed in contact with the bracket further on the inner circumferential side relative to the position of the stator coil on the outer circumferential side. An air hole through which air can flow is formed at the bracket at a position facing opposite an area thereof in contact with the stator and an air supply means for supplying air to flow through the air hole is disposed. This structure, in which the stator coil does not project out to the two sides of the stator core along the axial direction, allows the bracket to range further inward relative to the position of the stator coil on the outer circumferential side. As a result, the stator can be cooled to a full extent without coil ends.

(3) In the rotating electrical machine described in (2), cooling fins are formed in the air hole. This structure further improves the effect with which the stator is cooled.

(4) In the rotating electrical machine described in (2), the bracket is divided in a bowl-shaped front bracket and a bowl-shaped rear bracket, and the stator is held between the front bracket and the rear bracket set in contact with each other. The front bracket and the rear bracket in this structure are allowed to exchange heat with each other so as to cool the stator over its entire range.

(5) In the rotating electrical machine, the stator includes stator cores corresponding to a plurality of phases and the stator coil disposed in correspondence to each stator core, and a non-magnetic link plate is disposed between the stator cores corresponding to the individual phases. By adopting this structure, the extent of leakage flux occurring between the various phases can be reliably reduced.

(6) In the rotating electrical machine described in (5), positioning portions are formed at the stator cores corresponding to the individual phases and the link plate. The positioning portions are used to position the stator cores and the link plate relative to one another along the circumferential direction. By adopting this structure, the stator cores corresponding to the various phases can be positioned along the circumferential direction accurately.

(7) In the rotating electrical machine, the stator core is constituted with two split stator core component members separated from each other along the axial direction and the stator core component members assume shapes identical to each other. Since this structure eliminates the need to manufacture multiple types of stator core component members, a rotating electrical machine can be provided at low cost.

(8) In the rotating electrical machine, the stator includes stator cores corresponding to a plurality of phases and the stator coil disposed in correspondence to each stator core and the individual stator cores are integrated via a non-magnetic member on an outer circumferential side thereof. In this structure, the individual stator cores are integrated while forming a gap through which air can flow between the stator claw poles.

(9) In the rotating electrical machine described in (8), the non-magnetic member disposed on the outer circumferential side of the stator cores is constituted with a metal reinforcement ring assuming an annular shape. By assuming this structure, the strength of the stator cores, even if they are constituted with compressed soft magnetic composite, can be improved.

What is claimed is:

1. A rotating electrical machine, comprising:
    a field magnet disposed around a rotational axis;
    a rotor core disposed so as to hold the field magnet, wherein the rotor core comprises field magnetic poles located at positions facing opposite stator claw poles at a stator core;
    a stator coil wound around in an annular pattern on an outer circumferential side of a rotor; and
    a stator core that comprises stator claw poles located at a position facing opposite the rotor and alternately extending from two sides taken along an axial direction and is disposed so as to surround the stator coil, wherein:
    a reactance to be guided to the stator coil is reduced by keeping down a quantity of an interlinking magnetic flux traveling from front ends of the stator claw poles through a recessed portion, the interlinking magnetic flux being generated with an electric current flowing through the stator coil;
    the distance between the stator core claw poles and the recessed portion is so arranged that a magnetic reluctance manifesting between front ends of the stator claw poles and the recessed portion facing opposite centers of the stator claw poles along the circumferential direction is set greater than the magnetic reluctance between the front ends of the claw poles and the stator core enclosing member facing opposite the front ends; and
    a distance between front ends of the stator core claw poles and a center of the recessed portion facing opposite centers of the stator claw poles along the circumferential direction is taken 0.8-2.0 times as large as a distance between front ends of the stator core claw poles and the recessed portion facing opposite centers of the stator claw poles along the circumferential direction.

2. A rotating electrical machine, comprising:
    a field coil wound around a rotational axis;
    a rotor core that comprises rotor claw poles that are magnetized with alternating polarities with a magnetic flux induced via the field coil disposed along a circumference of the rotational axis;
    a stator coil wound around in an annular pattern on an outer circumferential side of a rotor; and
    a stator core that comprises stator claw poles located at a position facing opposite the rotor and alternately extending from two sides taken along an axial direction, wherein:
    the stator core comprises a recessed portion ranging from a point near a front end portion of each of the stator claw poles to a rear surface of the stator core;
    the front ends of the stator claw poles are positioned beyond the recessed portion facing opposite the stator claw poles along the axial direction.

3. A rotating electrical machine according to claim 2, wherein:
    the recessed portion facing opposite the stator claw poles is formed in one of a quadrangular shape, a triangular shape, a trapezoidal shape and a circular arc shape along the axial direction.

4. A rotating electrical machine according to claim 2, wherein:
    the stator claw poles to interlink with a magnetic flux from the rotor are formed so as to have a smaller sectional area at the front ends thereof than a sectional area of base portions of the stator core claw poles, within a sectional area range in which no magnetic saturation is induced by the interlinking magnetic flux.

5. A rotating electrical machine according to claim 2, wherein:
    the stator claw poles are formed so that a width thereof measured along the circumferential direction, which is smallest starting at the front ends, gradually increases along the axial direction.

6. A rotating electrical machine according to claim 5, wherein:
    the stator claw poles are formed so that a thickness thereof measured along the radial direction changes continuously along the axial direction from the front ends.

7. A rotating electrical machine according to claim 5, wherein:
    the stator claw poles are formed so that a thickness thereof measured along the radial direction changes in stages along the axial direction from the front ends.

8. A rotating electrical machine according to claim 5, wherein:
    the stator claw poles are formed so that a thickness thereof measured along the radial direction changes on a side on which surfaces facing opposite the stator coil are present along the axial direction from the front ends.

9. A rotating electrical machine according to claim 2, wherein:
    base portions of claw poles at the rotor assume a greater width relative to middle portions, the middle portions assume a greater width than front end portions and the middle portions sustain a substantially constant width.

10. A rotating electrical machine according to claim 1, wherein:
    the front ends of the stator claw poles are positioned beyond the outer circumferential member facing opposite the stator claw poles along the axial direction.

11. A rotating electrical machine according to claim 1, wherein:
    the stator claw poles to interlink with a magnetic flux from the rotor are formed so as to have a smaller sectional area at the front ends thereof than a sectional area of base portions of the stator core claw poles, within a sectional area range in which no magnetic saturation is induced by the interlinking magnetic flux.

12. A rotating electrical machine according to claim 1, wherein:
    the stator claw poles are formed so that a width thereof measured along the circumferential direction, which is smallest starting at the front ends, gradually increases along the axial direction.

13. A rotating electrical machine according to claim 1, wherein:
    base portions of claw poles at the rotor assume a greater width relative to middle portions, the middle portions assume a greater width than front end portions and the middle portions sustain a substantially constant width.

14. A rotating electrical machine, comprising:
    a field coil wound around a rotational axis;
    a rotor core that comprises rotor claw poles that are magnetized with alternating polarities with a magnetic flux induced via the field coil disposed along a circumference of the rotational axis;
    a stator coil wound around in an annular pattern on an outer circumferential side of a rotor; and
    a stator core that comprises stator claw poles located at a position facing opposite the rotor and alternately extending from two sides taken along an axial direction, wherein:

the stator core comprises a recessed portion ranging from a point near a front end portion of each of the stator claw poles to a rear surface of the stator core;

a distance between the stator core claw poles and the recessed portion is so arranged that a magnetic reluctance manifesting between front ends of the stator claw poles and the recessed portion facing opposite centers of the stator claw poles along the circumferential direction is set greater than the magnetic reluctance manifesting between the front ends of the claw poles and the recessed portion facing opposite the front ends; and a distance between front ends of the stator core claw poles and a center of the recessed portion facing opposite centers of the stator claw poles along the circumferential direction is taken 0.8-2.0 times as large as a distance between front ends of the stator core claw poles and the recessed portion facing opposite centers of the stator claw poles along the circumferential direction.

15. A rotating electrical machine according to claim 2, wherein:

a distance between front ends of the stator core claw poles and a center of the recessed portion facing opposite centers of the stator claw poles along the circumferential direction is taken 0.8-2.0 times as large as a distance between front ends of the stator core claw poles and the recessed portion facing opposite centers of the stator claw poles along the circumferential direction.

16. A rotating electrical machine according to claim 3, wherein:

a distance between front ends of the stator core claw poles and a center of the recessed portion facing opposite centers of the stator claw poles along the circumferential direction is taken 0.8-2.0 times as large as a distance between front ends of the stator core claw poles and the recessed portion facing opposite centers of the stator claw poles along the circumferential direction.

* * * * *